United States Patent
Hopkins et al.

(10) Patent No.: US 7,660,421 B2
(45) Date of Patent: *Feb. 9, 2010

(54) METHOD AND SYSTEM FOR SECURE STORAGE, TRANSMISSION AND CONTROL OF CRYPTOGRAPHIC KEYS

(75) Inventors: Dale W. Hopkins, Georgetown, KY (US); Susan Langford, Sunnyvale, CA (US); Larry Hines, Santa Clara, CA (US); Ching-Hsuan Chen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

This patent is subject to a terminal disclaimer.

(21) Appl. No.: 10/187,404

(22) Filed: Jun. 28, 2002

(65) Prior Publication Data

US 2004/0001595 A1 Jan. 1, 2004

(51) Int. Cl.
*H04L 9/00* (2006.01)
(52) U.S. Cl. .................. 380/277; 380/44; 380/280; 380/281; 726/5; 726/30; 713/161; 713/168; 713/169; 713/181; 713/187
(58) Field of Classification Search ............. 713/181, 713/168, 169, 161; 380/30, 277, 28, 40
See application file for complete search history.

(56) References Cited

U.S. PATENT DOCUMENTS

| | | | | |
|---|---|---|---|---|
| 4,924,515 A | * | 5/1990 | Matyas et al. | 380/280 |
| 4,941,176 A | * | 7/1990 | Matyas et al. | 380/280 |
| 5,142,578 A | * | 8/1992 | Matyas et al. | 380/280 |
| 5,200,999 A | * | 4/1993 | Matyas et al. | 380/277 |
| 5,214,698 A | * | 5/1993 | Smith et al. | 380/280 |
| 5,265,164 A | * | 11/1993 | Matyas et al. | 380/30 |
| 5,363,447 A | * | 11/1994 | Rager et al. | 380/273 |
| 6,333,983 B1 | * | 12/2001 | Enichen et al. | 380/273 |
| 6,378,072 B1 | * | 4/2002 | Collins et al. | 713/187 |
| 6,947,556 B1 | * | 9/2005 | Matyas et al. | 380/29 |
| 6,959,086 B2 | * | 10/2005 | Ober et al. | 380/30 |
| 7,055,029 B2 | * | 5/2006 | Collins et al. | 713/161 |
| 2002/0080958 A1 | * | 6/2002 | Ober et al. | 380/44 |
| 2003/0048905 A1 | * | 3/2003 | Gehring et al. | 380/270 |

OTHER PUBLICATIONS

Mihir Bellare et al, Keying hash functions for Message Authentication, CRYPTO, 1996.*

(Continued)

*Primary Examiner*—Nasser G Moazzami
*Assistant Examiner*—Shanto M Abedin

(57) ABSTRACT

A system and method are described supporting secure implementations of 3DES and other strong cryptographic algorithms. A secure key block having control, key, and hash fields safely stores or transmits keys in insecure or hostile environments. The control field provides attribute information such as the manner of using a key, the algorithm to be implemented, the mode of use, and the exportability of the key. A hash algorithm is applied across the key and control for generating a hash field that cryptographically ties the control and key fields together. Improved security is provided because tampering with any portion of the key block results in an invalid key block. The work factor associated with any manner of attack is sufficient to maintain a high level of security consistent with the large keys and strong cryptographic algorithms supported.

23 Claims, 31 Drawing Sheets

OTHER PUBLICATIONS

B. Preneel, Hash functions and MAC algorithms based on block ciphers, Springer, 1997.*

IBM Technical Disclosure Bulletin, Feb. 1992, TDB-ACC-No. NN9202104, pp. 1-7.*

IBM Technical Disclosure Bulletin, TDB-ACC-No. NN9304107, pp. 1-5, Apr. 1993.*

Coppersmith et al., IBM Research Report entitled "Triple DES Cipher Block Chaining with Output Feedback Masking", Oct. 21, 1996, pp. 1-19, published by IBM Research Division.

"Advanced Encryption Standard", found on Internet at http://searchsolaris.techtarget.com/sDefinition/O,,sid12_gci344759,00.html on Jun. 6, 2002.

"FIPS", found on Advanced Encryption Standard website, http://csrc.nist.gov/encryption/aes/ on Jun. 6, 2002.

* cited by examiner

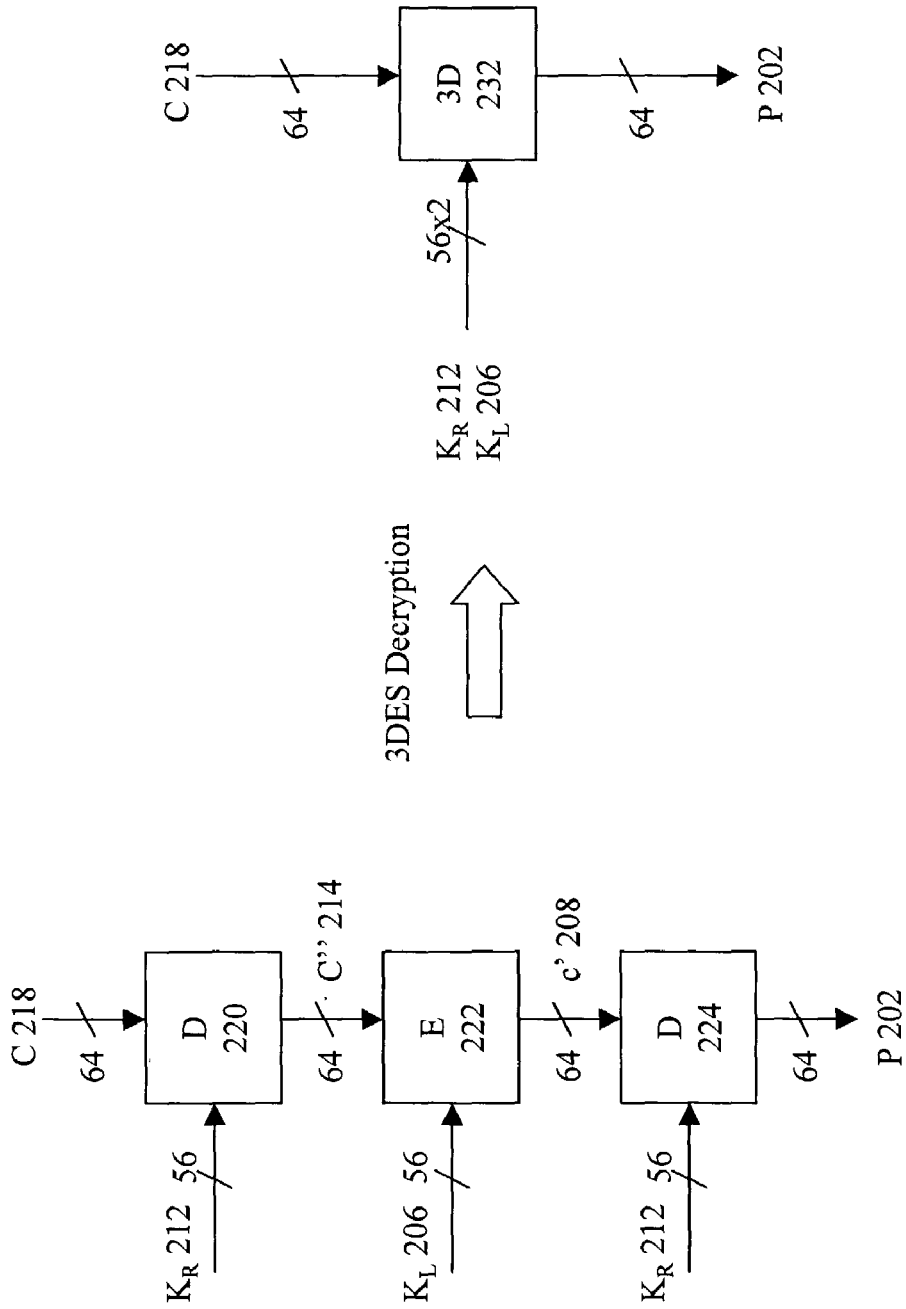

| Byte | Description |
|---|---|
| 0 | Version number. "1" in the first implementation. |
| 1 | Key usage. |
| 2 | Algorithm |
| 3 | Mode of use (e.g., encrypt only, EEE mode only, etc.) |
| 4 | Exportability |
| 5 | Padding Flag (e.g., "P" for padding, "N" for no padding) |
| 6 | Special Handling Information |
| 7 | Other Information |

Figure 7

| Byte # | Description | Contents |
|---|---|---|
| 0 | Version Number | 1 - in the first version |

Figure 8A

| Byte # | Description | Contents |
|---|---|---|
| 1 | Key Usage | A - ATM Master Key<br>C - CVV<br>D - for Data Encryption<br>I - IV<br>K - for Key Encryption<br>M - MAC<br>O - Manufacturer Defined<br>P - Pin Encryption<br>R - Reference PIN Block<br>S - Signature<br>T - Token Key<br>V - PIN Verification<br>X - Translation and Conversion Table<br>c - Communication Key<br>d - Derivation Key<br>m - Master Key<br>n - Diebold Number |

Figure 8B

| Byte # | Description | Contents |
|---|---|---|
| 2 | Algorithm | 0 - Manufacturer defined<br>1 - SHA-1<br>2 - RC2, or MD2<br>3 - IBM 3624<br>4 - RC4 or MD4<br>5 - RC5 or MD5<br>7 - IBM 4731<br>A - ANSI<br>B - Atalla Bilevel<br>D - DES<br>E - EMV Key Derivation<br>F - Manufacturer Defined<br>H - Diffie-Hellman<br>I - Identikey<br>J - AES<br>L - SSL<br>N - NCR<br>R - RSA<br>S - DSA<br>U - Unknown<br>V - Visa<br>Y - Manufacturer Defined<br>Z - Manufacturer Defined<br>a - Manufacturer Defined<br>b - Manufacturer Defined<br>d - Docutel<br>e - Elliptic Curve<br>m - MD2<br>s - Manufacturer Defined |

Figure 8C

| Byte # | Description | Contents |
|---|---|---|
| 3 | Mode of Use | n - No Special Restrictions<br>E - Encrypt Only<br>D - Decrypt Only<br>G - Generate Only<br>V - Verify Only<br>T - Manufacturer Defined<br>e - Manufacturer Defined<br>d - Manufacturer Defined<br>v - Manufacturer Defined<br>g - Manufacturer Defined<br>P - Manufacturer Defined<br>M - Manufacturer Defined<br>U - Manufacturer Defined |

Figure 8D

| Byte # | Description | Contents |
|---|---|---|
| 4 | Exportability | U - Unprotected, exportable in the clear<br>S - Sensitive, Exportable under untrusted key<br>E - Exportable under trusted key (default)<br>N - Not Exportable |

Figure 8E

| Byte # | Description | Contents |
|---|---|---|
| 5 | Padding Flag | 0 - No padding<br>1 - Padding |

Figure 8F

| Byte # | Description | Contents |
|---|---|---|
| 6 | Special Handling | 0 - Manufacturer Defined<br>C - CA Key<br>H - Hash16<br>T - Manufacturer Defined<br>A - KEK -app<br>R - Restricted KEK<br>S - Manufacturer Defined<br>r - Restricted KEK, short form |

Figure 8G

| Byte # | Description | Contents |
|---|---|---|
| 7 | Other Information | When byte 6 = 0,<br>a - Encrypted key is an ANSI KPE, header: 1PANNP00<br>b - Encrypted key is encrypt-only ANSI KPE, header: 1PAENP00<br>c - Encrypted key is decrypt-only ANSI KPE, header: 1PADNP00<br>d - Encrypted key is a DES KD, header: 1DDNNP00<br>e - Encrypted key is encrypt-only DES KD, header 1DDENP00<br>f - Encrypted key is decrypt-only DES KD, header: 1DDDNP00<br>g - Encrypted key is a DES KMAC, header: 1MDNNP00<br>h - Encrypted key is a Diebold number table, header: 1nDNNP00<br>k - Encrypted key is a KEK key, header: 1KDNNP00 |

Figure 8H

METHOD AND SYSTEM FOR SECURE STORAGE, TRANSMISSION AND CONTROL OF CRYPTOGRAPHIC KEYS

FIELD OF THE INVENTION

The present invention relates to the field of cryptographic processing. More particularly, the present invention relates to a method and system for implementing a key block for secure storage, transmission and control of cryptographic keys.

BACKGROUND OF THE INVENTION

The Data Encryption Standard (DES) has been used for several decades, but it is currently near the end of its useful life. Shown in FIGS. 1A and 1B are block diagrams depicting the operation of DES to encrypt and decrypt, respectively. DES is a Feistel cipher that processes plaintext blocks of n=64 bits, producing 64-bit cipher text blocks. As shown in FIG. 1A, plaintext message P 102 is passed through a DES encryption algorithm E 108 by application of a 56-bit key K 104 used to generate ciphertext C 106. Note that K 104 is 56-bits in length, however, the input key K 104 is a 64-bit key with 8 parity bits. Thus, the work factor of key K 104 is $2^{56}$ and not $2^{64}$. The complementary decryption is shown in FIG. 1B wherein ciphertext C 106 is passed through a DES decryption algorithm D 112 by application of key K 104 which generates the original plaintext P 102.

With the useful life of DES near an end, triple DES (3DES) is seen as the choice for the near term future. The documents FIPS 46-3 and FIPS 81 describe 3DES and DES and are herein incorporated by reference for all purposes. With an understanding of DES, 3DES can readily be understood as the multiple application of various single DES algorithms as shown in FIGS. 2A-D. As shown, plaintext message P 202 is passed through a DES encryption algorithm E 204 by application of a 56-bit key $K_L$ 206 to generate a first intermediate ciphertext result c' 208. Such first intermediate ciphertext result is then passed through a DES decryption algorithm D 210 by application of $K_R$ 212 to generate a second intermediate ciphertext result c" 214. Such second intermediate ciphertext result is then passed through a DES encryption algorithm E 216 by application of key $K_L$ 206 to generate the ciphertext C 218. The three-stage operation of FIG. 2A is summarized in FIG. 2B. As shown, the plaintext message P 202 is passed through a 3DES encryption algorithm 3E 230 by application of keys $K_L$ 206 and $K_R$ 212 to generate ciphertext 218. The complementary 3DES decryption is shown in FIG. 2C as a sequential operation of DES decryption D 220, encryption E 222 and decryption D 224 to transform ciphertext C 218 into plaintext P 202 using keys $K_L$ 206 and $K_R$ 212. The three stage algorithm of FIG. 2C is summarized in FIG. 2D as the input of ciphertext C 218, and keys $K_L$ 206 and $K_R$ 212 to 3DES decryption algorithm 3D 232 to generate plaintext P 202.

Today's secure financial network environment is unique in that it is at a transition point where single DES systems are phasing out and being replaced by 3DES implementations and eventually other algorithms. One such new algorithm is the Advanced Encryption Standard (AES) which has been accepted as a standard and will be introduced into the market in coming years. The document FIPS 197 describes AES and is herein incorporated by reference for all purposes.

The phasing out of single DES is being done because it has been demonstrated that an exhaustive search of the $2^{56}$ DES key space can be done in about 22 hours or less. The key space for 3DES is at least $2^{112}$, which is $2^{56}$ times larger than the single DES key search. Thus, one who implements 3DES should expect to get 3DES security as well as 3DES functionality. Furthermore, one who implements 3DES should expect no less than a $2^{112}$ exhaustive search in order to uncover the 3DES keys. Namely, security of the 3DES keys, $K_L$ and $K_R$, should be commensurate with the security of 3DES encryption and should, likewise, have a work factor of no less than $2^{112}$.

Shown in FIG. 3 is a cryptographic system 300 wherein an acquiring host 302 within cryptographic system receives cryptographic tasks from a point of sale (POS) network 304, an automatic teller machine (ATM) network 306 and a switch host system 308. As shown, cryptographic system 300 includes acquiring host 302 security module 310 and database 312. Notable within security system 300 is that security module 310 resides within a security boundary 314. Within security boundary 314, keys may exist without encryption (i.e., clear keys), but outside of security boundary 314, such as within acquiring host 302 or database 312, keys must be encrypted. As shown for cryptographic system 300, a master file key (MFK) 320 is implemented. Thus, when security module 310 passes keys from within security boundary 314 to locations outside security boundary 314, security module 310 first encrypts the keys using MFK 320. Thus, within acquiring host 302 and database 312 keys (K) exist as encrypted keys, (e.g., $E_{MFK}(K)$). In a single DES implementation, the MFK algorithm is typically a single DES algorithm. Moreover, when communicating keys beyond cryptographic system 300 (e.g., to POS or ATM networks), keys may be encrypted in a similar manner with a key exchange key (e.g., $E_{KEK}(K)$).

In implementing 3DES systems, however, current schemes for encrypting keys outside of security boundary 314 do not produce the required level of security for the keys. For example, the ANSI X9.24 standard, herein incorporated by reference for all purposes, recommends implementing 3DES key encryption in electronic code book (ECB) mode. See ANSI X9.17 standard and ANSI X9.71 standard, incorporated herein by reference for all purposes, for examples of other key blocks. This, however, increases the work factor by only 2 to an exhaustive search work factor of $2 \times 2^{56} = 2^{57}$. This is far less than the required $2^{112}$ work factor for implementations of 3DES.

Specifically, in implementing the ECB mode for 3DES, the MFK is used in a 3DES algorithm thus providing a $2^{112}$ work factor. The MFK is used to individually encrypt the two keys, $K_L$ and $K_R$, for a 3DES implementation. Detrimentally, the individually encrypted keys are then stored, many times side-by-side, in a database. Thus, although an adversary cannot attack the MFK algorithm directly as it has a $2^{112}$ work factor, an adversary can attack the individually stored keys. It has been shown that an adversary could determine each of KL and KR with a work factor of $2^{56}$, thus the combined work factor is only $2^{57}$, an unacceptable level of security for 3DES. A white paper by Hopkins et. al, entitled *"Secure Keyblock for Storage, Transmission, and Control of Cryptographic Keys in a High Performance Server Environment,"* herein incorporated by reference for all purposes, provides several examples of how improper implementation of 3DES can be attacked. Table 1, below, summarizes the susceptibility of various modes when used to protect key blocks as indicated by their work factor.

TABLE 1

| Triple DES Mode Using MFK | Attack as Described in White Paper | Work Factor to Recover DES Key |
|---|---|---|
| ECB | Meet in the Middle | $2^{112}$ with $2^{56}$ key table |
| Any Mode | Turn Security Module Against Itself | No Work Factor |
| ECB | C1, C4 | $2 \times 2^{56}$ |
| CBC | IV1, C1, C4 | $2 \times 2^{56}$ |

It is apparent from the table that all prior art DES modes have some susceptibility to manipulation and modification by an adversary. This suggests, the integrity of the ciphertext key must be better maintained.

Thus, there exists a need for a key protection system and method that can support a cryptographic algorithm such as 3DES without compromising the algorithm's associated work factor. Furthermore, it is desirable that those that implement cryptographic systems and their service providers have a clear and common understanding of the basic design and implementation objective of a secure cryptographic system. In implementing such a system and method, a method assuring the integrity of all keys used in the system should be adopted.

SUMMARY OF THE INVENTION

In an embodiment of the present invention, a system and method are described that avoid pitfalls of prior art implementations of 3DES by implementing a novel secure key block. In particular, the present invention provides certain structures that prevent key information encrypted under 3DES or other high work fact cryptographic algorithm from being manipulated by an adversary. An embodiment provides for the secure encryption of 3DES keys outside of a security boundary. Another embodiment provides for three distinct, but associated, fields for use in a cryptographic system: a control field, an encrypted key field, and a message authentication code (MAC) field. The control field provides key control attribute information such as the manner of using a key, the algorithm to be implemented with the key, the mode of use of the key, and the exportability of the key. Other key control attributes can include a flag indicating whether padding of the key field has been implemented. Yet other key control attributes can include information on handling keys in a special manner.

In an embodiment, the encrypted key field is generated by applying 3DES encryption on the clear key parts using a first variant of the MFK. It should be noted, however, that key field encryption in the present invention can be implemented using other high work factor encryption algorithms such as the advanced encryption standard (AES). Upon generation of the encrypted key field and the control field, a MAC algorithm such as a DES MAC is applied for generating a MAC field using a second variant of the MFK. Advantageously, the MAC field cryptographically binds the control and key fields together. Thus, all the fields are cryptographically tied. In an embodiment of the invention, improved security is provided because tampering of any portion of the key block results in detection of unusable data. Moreover, the work factor associated with any manner of attack provides a work factor that maintains the highest level of security.

In an embodiment, after retrieval or transmission of the secure key block must be validated and decrypted before use. Validation is performed by generating a computed MAC across the received control field and the received encrypted key field. By using the same MAC algorithm with the same MFK and the same inputs, the computed MAC field will match the received MAC field if the secure key block is tamper-free. Thus, the integrity of the secure key block is validated. Conversely, if an adversary has tampered with the secure key block or if errors have occurred in receiving the secure key block, the computed MAC field will not match the received MAC field and the secure key block is not validated. Where the secure key block is validated, decryption of the encrypted key field can proceed to reveal the clear keys. Moreover, attributes identified within the control field can be used to properly determine permitted uses of the clear keys. Further validation can be performed by checking that any requested operation is consistent with the control attributes.

In other embodiments of the present invention, the integrity of secure key blocks and their contents is assured through application of keyed hash functions. In these embodiments, a hash field is computed wherein it is computationally infeasible to find two distinct inputs that produce the same hash field. In this manner, the hash functions provide strong and unique binding of the various fields of secure key blocks. These embodiments may provide a computational advantage when a hash function is less computationally intensive than a block cipher such as 3DES.

An advantage of the invention is that keys cannot be modified or manipulated in any unauthorized manner without detection. Furthermore, the secrecy of all private keys is assured such that an adversary cannot access any clear text form of any private keys and is further prevented from any means of manipulating ciphertext keys. A further advantage of the present invention is that a key used to protect another key provides equal or greater cryptographic strength as the key being protected.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 2C is a block diagram depicting the implementation of triple DES decryption according to the prior art.

FIG. 2D is a simplified block diagram depicting the implementation of triple DES decryption according to the prior art.

FIG. 7 is a description of the various bytes within the control field according to an embodiment of the present invention.

FIGS. 8A through 8H contain tables listing attribute definitions for bytes 0 through 7, respectively, according to an embodiment of the present invention.

DETAILED DESCRIPTION OF THE PREFERRED EMBODIMENTS

The present invention provides a secure key block that can be used in conjunction with, among other things, the storage of keys outside of a secure boundary. A key block is a data structure used to store or exchange cryptographic keys within hostile environments. In an embodiment, a key block is a block of data that contains an encrypted key and other information used to control and validate the encrypted key. The present invention describes a secure key block that includes a control field, an encrypted key field and an Message Authentication Code (MAC) field wherein the these fields are implemented and associated cryptographically to prevent tampering of any part of the key block.

Figure 4A:
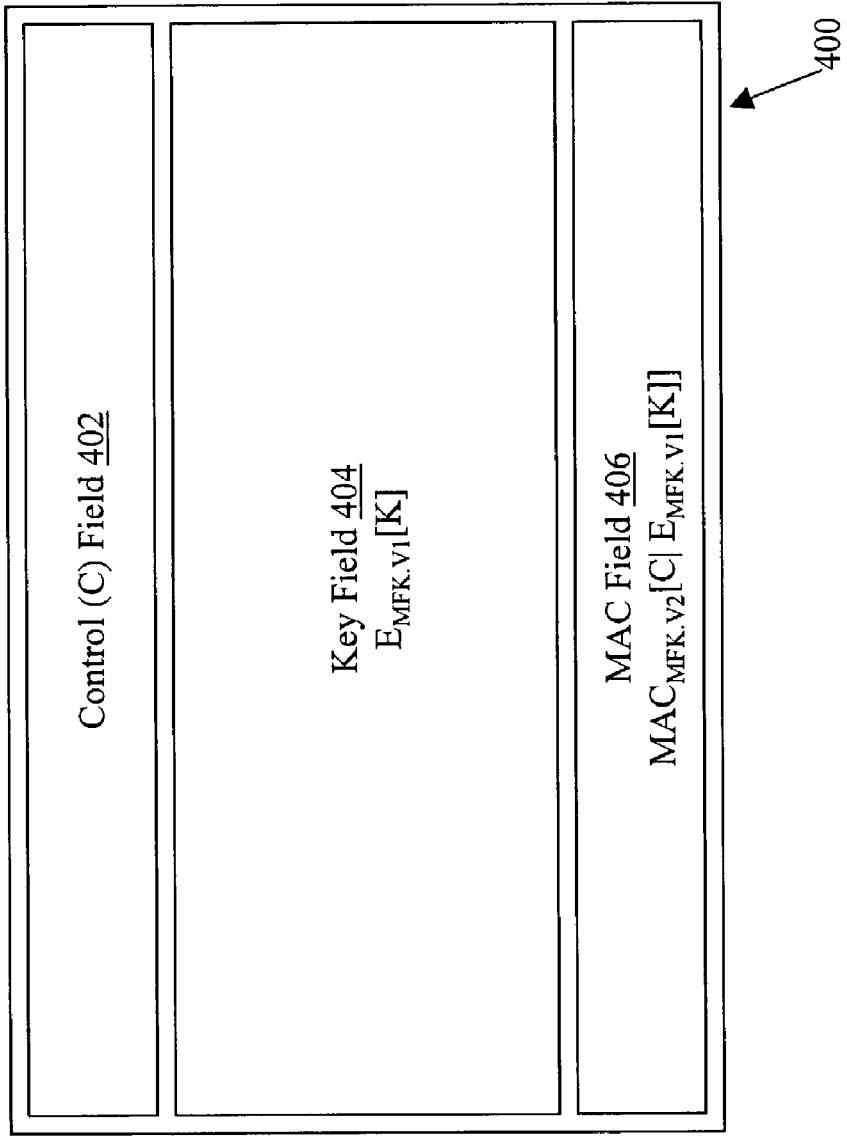
FIG. 4A is a block diagram representation of a key block having a control field, a key field and a MAC field according to an embodiment of the present invention.

An embodiment of the present invention is shown in FIG. 4A. Shown in FIG. 4A is key block 400 containing control field 402, key field 404, and message authentication code (MAC) field 406. Control field 402 is used to store key control attributes such as the algorithm in use and key usage. In an embodiment of the invention, attributes are stored as bit or byte values in fixed positions or as TLV (Tag, Length, Value) encoded objects for maximum flexibility. In another embodiment of the invention, fixed bits or bytes are used for common attributes and TLV encoding is used for rare attributes. Rare attributes can include validity periods or decimalization tables. The benefit of this embodiment is that key blocks are self-describing, even without applying or having the decryption master file key. Such an embodiment can assist technical support and customer security personnel in identifying implementation issues. In an embodiment supporting the use of TLV encoding, the present invention becomes very flexible. The present invention provides an elegant approach to controlling keys while keeping overhead to a minimum.

In various embodiments of the invention, the length of the key is hidden from an adversary. This is accomplished in several ways. In an embodiment, one key control attribute is used to describe the manner of storing the key, but not the length. For example, a key can have no padding, meaning that the length of the clear key is equal to the length of the encrypted key. Alternatively, a key can be padded. Appropriate padding schemes include PKCS 5 and SHA-1 padding. It is important to note that a padding indicator in the control field will not weaken the security of the keys. An indicator in the clear improves efficiency when padding is not used. For example, in RSA, public key cryptography, the length of the keys is public such that there is no need to pad to hide the length. Similarly, the minimum length of an AES key is long enough that there is no need to hide the use of short keys. Importantly, it may not be acceptable to arbitrarily pad without an indicator. For example, assume a 16 byte encrypted value has a decrypted value 0x01 as its final byte. While such byte could be a byte of PKCS 5 padding, it may also be the final byte of an actual key. Some cryptographic algorithms may allow for efficient identification of padding, however, others may not. Thus, an embodiment of the invention uses a padding indicator.

Figure 4B:
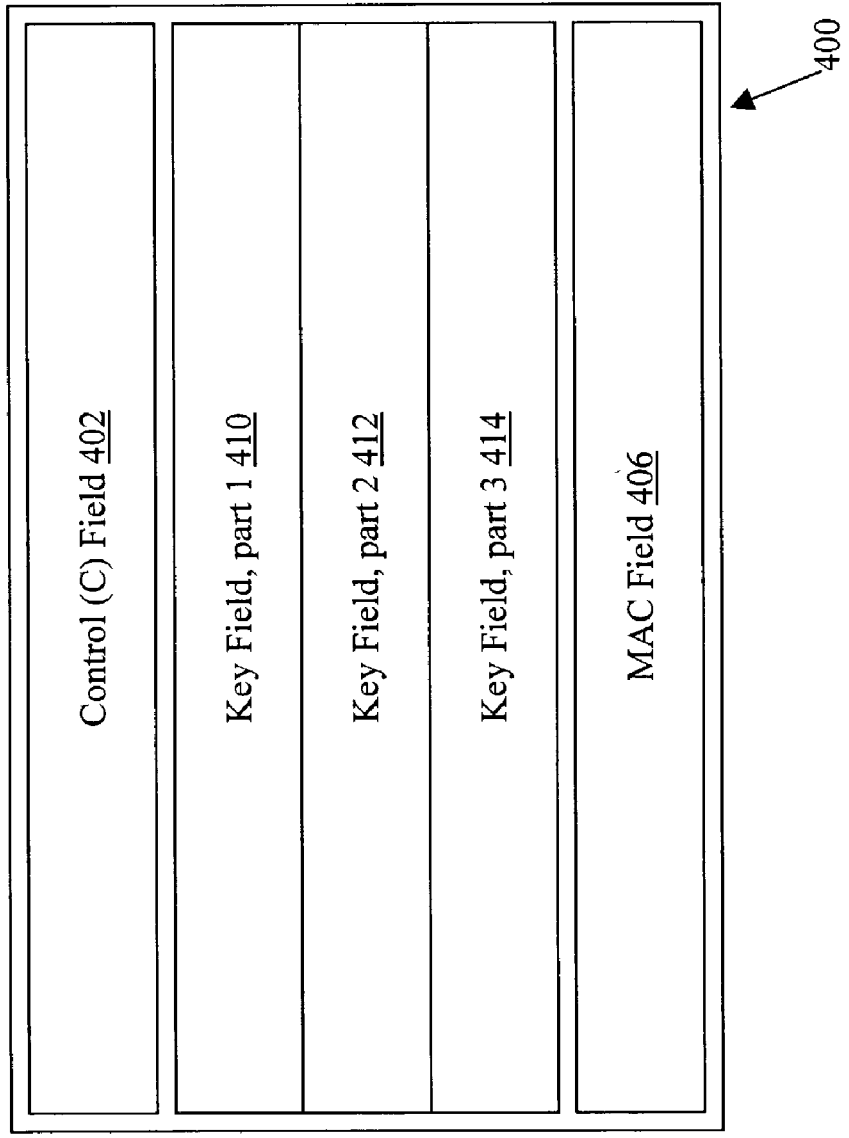
FIG. 4B is a block diagram representation of a key block wherein the key field is divided into three parts according to an embodiment of the present invention.

In an embodiment of the invention, encrypted key field 404 is three parts 410, 412, and 414 as shown in FIG. 4B that allow for protection of single DES, 2DES, and 3DES. When implementing single DES, the DES key information is placed in a known location with the rest of the field padded. For example, sub-field 410 would contain encrypted key information, with sub-fields 412 and 414 containing encrypted padded information The pad characters would be encrypted such that the adversary would not be able to observe a database of keys, for example, to distinguish a single DES key. A 3DES two-key implementation would occupy two parts, such as 410 and 412, while 414 is padded. Finally, a 3DES implementation with three keys would use the three sub-fields for key information. In an embodiment of the invention, key field 404 is of variable length. In an exemplary embodiment, key field 404 is 24 or 48 binary bytes ASCII for DES implementation.

As further provided by the invention, MAC field 406 (FIG. 4A) binds the control and key field together such that any tampering by an adversary causes an invalid MAC check. In one embodiment, MAC field 406 has 16 hex characters that can be represented as 8 ASCII characters.

Figure 5A:
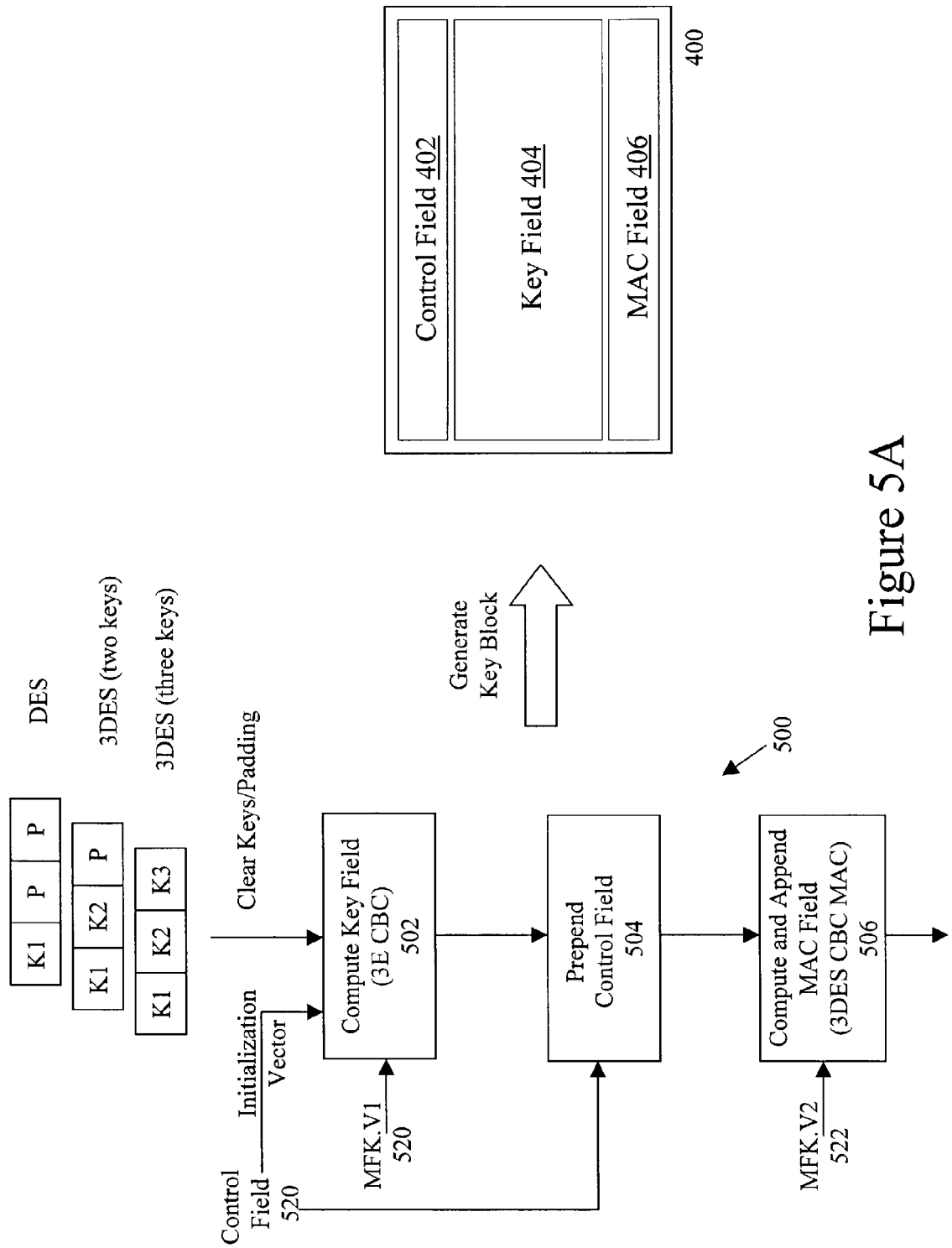
FIG. 5A is a block diagram representation of a method for generating the key block according to an embodiment of the present invention.

Shown in FIG. 5A is a diagram representing a method for generating a key block 400 including control field 402, key field 404, and MAC field 406. As shown, the key information, be it single DES, two-key 3DES or three-key 3DES, is passed through 3DES encryption block 502 to generate the cryptogram C1, C2 and C3 to be provided as encrypted key field 404. In an embodiment, a first variant of the master file key MFK.V1 520 is applied as a first encryption key. In this embodiment, the control field is applied as the initialization vector (IV). The first variant of the master file key MFK.V1 520 and the control field as the initialization vector are then provided at block 502 to encrypt the plaintext key and create encrypted key field 404. This generated key field 404 is prepended with control field 402 at block 504. Control field 402 in conjunction with key field 404 are then passed through 3DES Cipher-Block Chaining (CBC) MAC operations at block 506 to generate MAC field 406. In this way, MAC field 406 is cryptographically tied to control field 402 and key field 404. In an embodiment, a second variant of the master file key MFK.V2 522 is used to form a 3DES keyed MAC. MFK.V2 522 is then provided at block 506 to encrypt the control and key fields and create the MAC field 406. Through the implementation of the MAC field, modification of any field will be detectable, thus requiring that any attack have a work factor of at least $2^{112}$ consistent with the work factor of 3DES.

Figure 3:
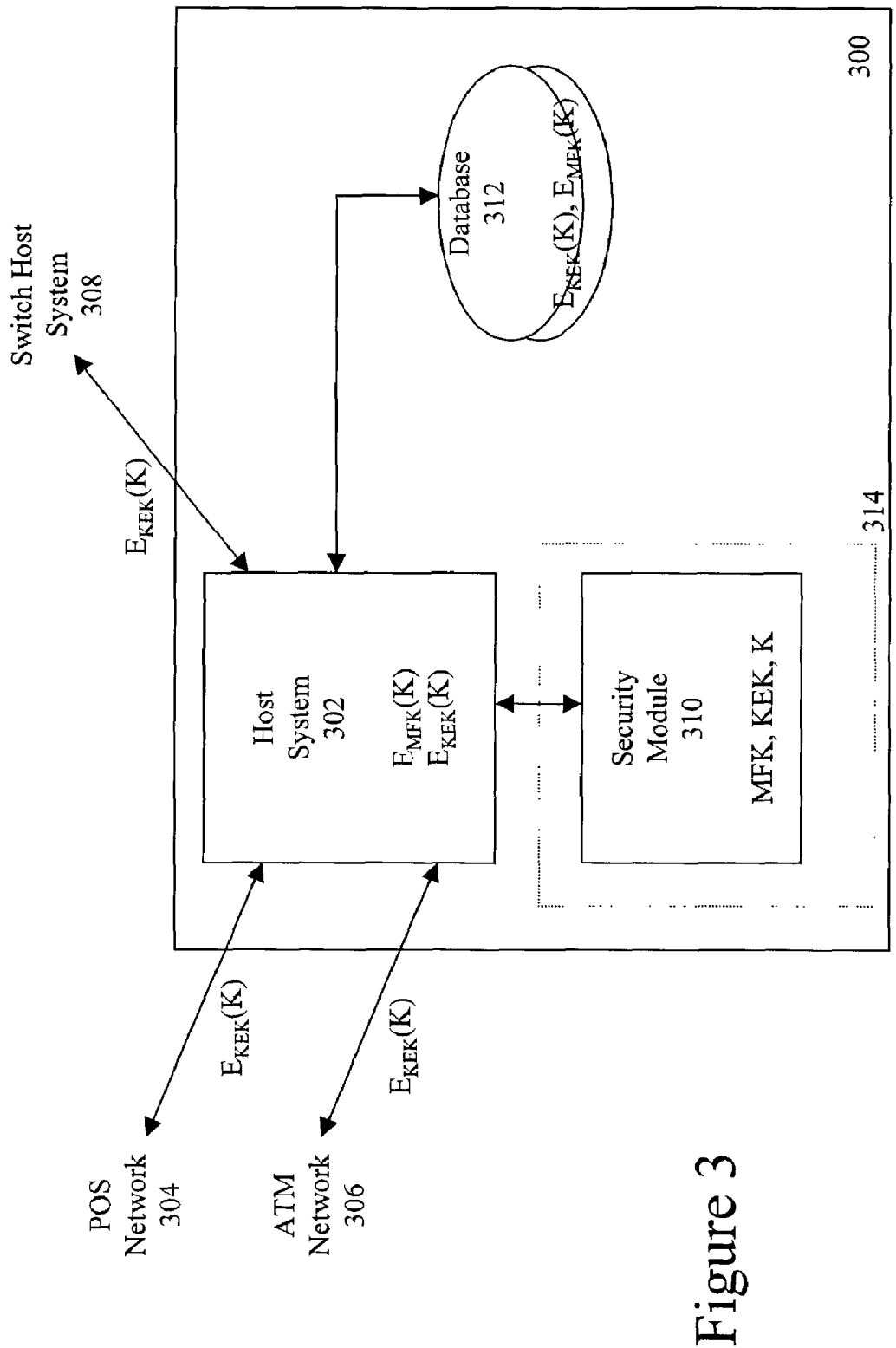
FIG. 3 is a block diagram depicting a cryptographic system having an acquiring host, a database, and a security module.
Figure 6A:
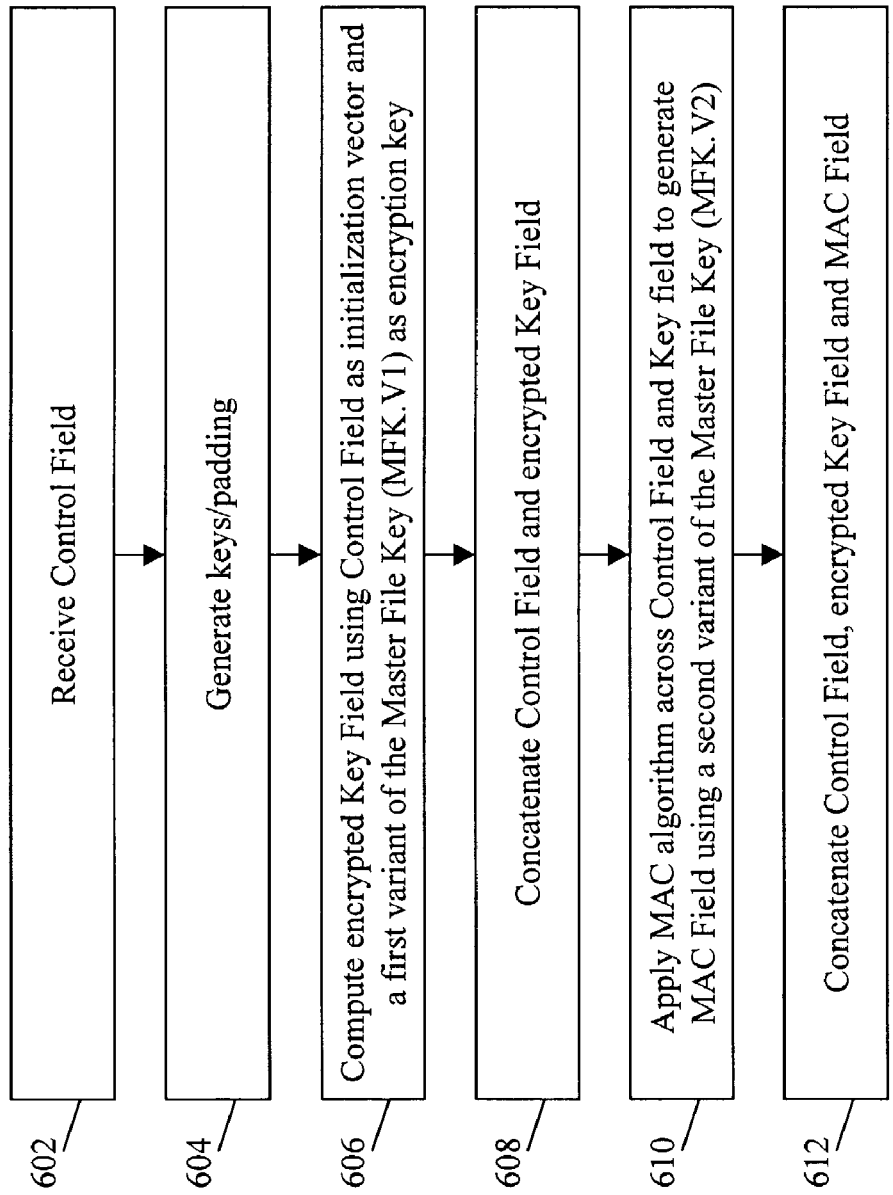
FIG. 6A is a flow block of a method for generating the key block according to an embodiment of the present invention.

Shown in FIG. 6A is a flow block providing other details of a method of the present invention. As shown, a control field containing the necessary attributes for handling a cryptographic key is generated at step 602. Any cryptographic keys and/or padding are received at block 604. At step 606, the keys and/or padding are encrypted using the control field as an initialization vector and a first variant of the master file key (MFK.V1). Note that using the control field of as an initialization vector not only binds the control field to the key field, but also masks the use of the master file key. The control field and the encrypted key field are then concatenated at step 608. A MAC algorithm is then applied at step 610 across the control field and the key field to generate a MAC field using a second variant of the master file key (MFK.V2). The control, key, and MAC fields are then concatenated as a secure key block at step 612. Note that in the present embodiment, the use of a master file key (MFK) is described. One of skill in the art, however, will recognize that a key encryption key (KEK) can also be used. KEKs are often used to communicate keys beyond a secure hardware facility to another secure hardware facility, for example, between trusted banks. The key block as a whole can then be transmitted outside of the security module 310 of FIG. 3 to, for example, an acquiring host 302 or database 312. Moreover, a secure key block can be transmitted to other destinations such as through a POS network 304 or ATM network 306.

Figure 5B:
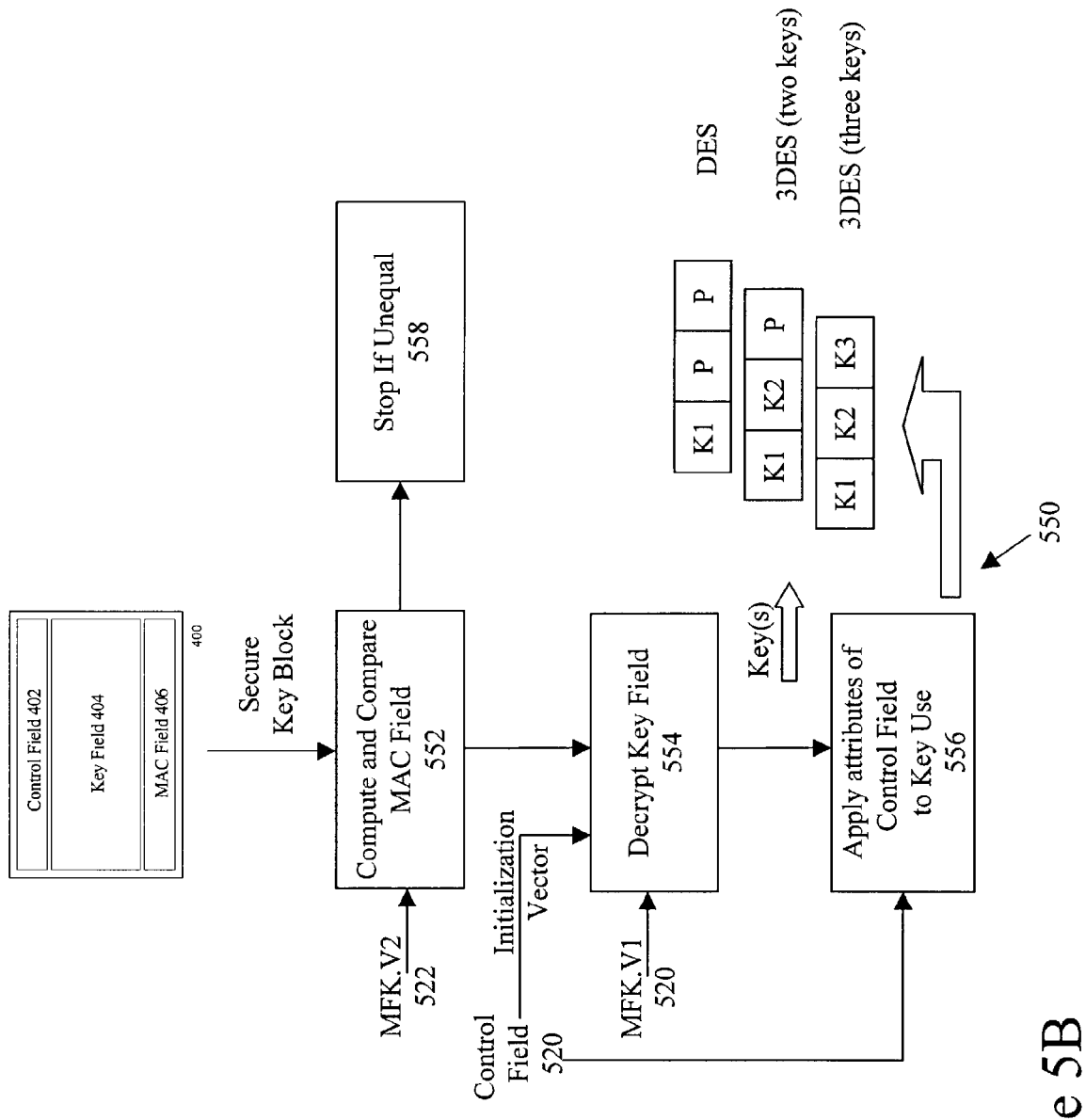
FIG. 5B is a block diagram representation of a method for validating the key block according to an embodiment of the present invention.

Shown in FIG. 5B is a diagram representing a method for validating a received key block 400 that includes control field 402, key field 404, and MAC field 406. As shown, upon receiving the key block the MAC field is computed and compared at block 552. The MAC field is computed in much the same manner as described for block 506 of FIG. 5A. In particular, the control field and the key field are applied to a 3DES CBC MAC algorithm using the second variant of the master file key (MFK.V2). Because the same information was used in applying the same algorithm, the computed MAC field should match the received MAC field. If it does, the method of the present invention proceeds; if not, the method terminates because no part of the invalid key block can be trusted. In a situation where the MAC fields match, the method of the present invention proceeds to decrypt the key field using the control field as the initialization vector and the first variant of the master file key (MFK.V1) as shown in block 554. By applying the control attributes at block 556 contained within the control field, the keys can then be properly used. At this point, any attempted misuse of the keys can also be detected. Where an attempted misuse is detected, the keys are discarded and the requested operation aborted.

Figure 6B:
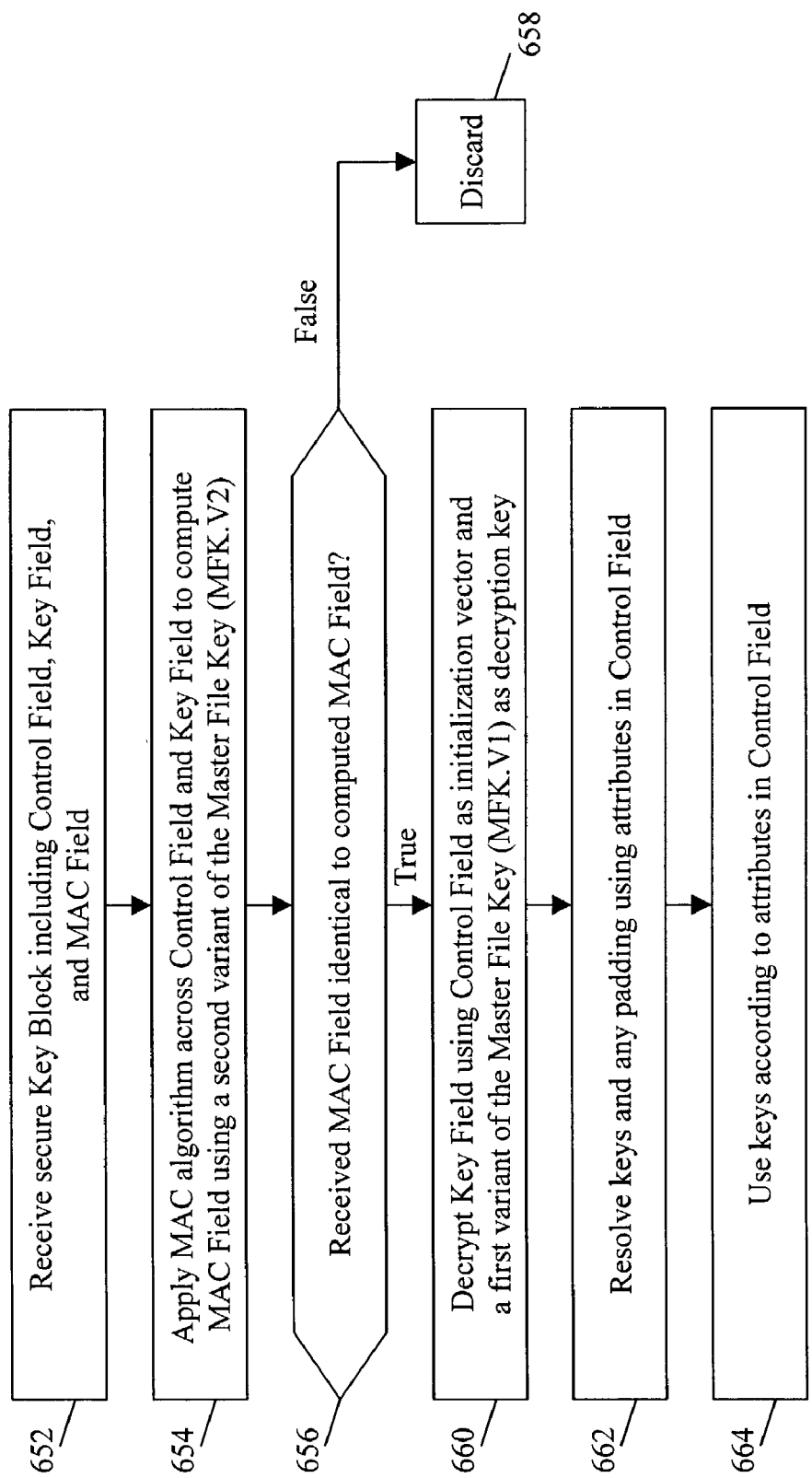
FIG. 6B is a flow block of a method for validating the key block according to an embodiment of the present invention.

Shown in FIG. 6B is a flow block providing other details of a method of the present invention. As shown, the secure key block is received at step 652 where the secure key block includes a control field, a key field and a MAC field. At step 654, the MAC algorithm is applied across the received control and key fields to generate a MAC field using the second variant of the master file key (MFK.V2). Thereupon, at step 656, the received MAC field is compared to the computed MAC field. If the fields do not match the secure key block is discarded at step 658. Because the MAC fields do not match, the keys contained within the secure key block cannot be trusted. If the MAC field match, step 660 is performed. At step 660, the key field is decrypted using the control field as an initialization vector and the first variant of the master file key (MFK.V1). Using attribute information contained within the control field, the keys can then be resolved from the decrypted key field at step 662. Moreover, other attribute information contained within the control field can further be applied at step 664. Further checks, can be applied at step 664 to ensure the proper use of the keys. For example, any attempted misuse of the keys can lead to discarding the keys and aborting requested operation.

Importantly, the methods of FIGS. 6A and 6B, as well as other methods described herein, can be used in combination. For example, the method of FIG. 6B can be used to validate a key encapsulated within a secure key block by using a first key, e.g., an MFK. Upon validation, the method of FIG. 6A can be implemented to in turn encapsulate the validated key in another key block using second key, e.g., a KEK. Many other combinations are possible as would be understood by one of skill in the art upon understanding the present disclosure.

With regard to the CBC MAC algorithm described above, it is important to note that there are a number of variations. The draft version of ISO 9797-1, herein incorporated by reference for all purposes, provides 6 variations of CBC MAC, each of which can be used with three different padding schemes. The ISO 9797-1 includes "standard" CBC MAC and ANSI retail MAC, which uses single DES for the MAC, but triple DES on the last block. It also includes a variation with 2DES on the first and last block with single DES on the middle block. But analysis has shown that these variations are significantly weaker against key search attacks. ANSI retail MAC can be broken with a work factor of $2^{57}$ and approximately $2^{32}$ MACs of known data. The 2DES based algorithm can be broken with similar effort. If clear keys are MACed, it would be difficult, but not impossible, for an attacker to get $2^{32}$ known keys. It is unlikely that an attacker would choose to focus this much effort on the key block, but since an attack is possible, it is desirable to avoid the weakness.

Upon consideration of the various MAC implementations, it has been observed that "regular" CBC MAC with 3DES as the inner block cipher provides true $2^{112}$ work factor security. While this algorithm may require more processing, it is not vulnerable to a key search attack. In an embodiment of the invention, the MAC is applied across the plaintext key. In such an embodiment, it is more difficult for an attacker to get known MACed values. Because the 3DES algorithm is not vulnerable to such attack, there is not a great advantage to applying MAC over the plaintext. Thus, in yet another embodiment of the invention, the MAC is applied across ciphertext without a significant loss in security. It should be noted that an advantage of applying the MAC algorithm to the ciphertext is the interoperability of key block of the present invention with prior art systems. In operation, a device that has not implemented the key block of the present invention can become compatible with the present invention by straightforwardly appending a clear control field to their already generated encrypted key field and applying a CBC MAC algorithm to the result. The clear control field would provide all the necessary information for handling the encrypted key field; and, the MAC field would assure that no part of the key block has been modified.

One of skill in the art will understand that other embodiments are possible without deviating from the teaching of the present invention. For example, where MFK keys are described, key encryption keys (KEKs) can also be used. Moreover, where 3DES has been described, other block ciphers such as AES are also appropriate.

Having addressed the general structure of the key block of the present invention and its use, the various fields of the key block will now be described with more detail. Addressing first the control field, an embodiment of the invention more particularly uses a clear control field. By clear control field it is meant that it is in the clear. In other words, the control field is not encrypted. As seen in many non-cryptographic applications, a control field can contain much information. In implementing the present invention, certain needs and concerns of cryptographic systems are addressed through the control field.

Among other things, the control field of the present invention provides for the communication of key control attributes. Key control attributes are a set of parameters that may include, for example, the algorithm for which a key may be used, the usage of the key, the mode of use of the key, the exportability of the key, and key ownership. Other items of information that can be included in the control field are special handling information and other information that may be needed for handling and processing the key. These are just some examples. More will be discussed including motivation for their implementation.

Key control attributes must exist if a cryptographic system is to maintain even a minimal level of logical security. Logical security is generally an attack against the system architecture and does not involve a direct physical assault against the cryptographic system. The simple existence of key control attributes, however, is a necessary but not sufficient condition for maintaining the integrity of the security architecture. To maintain logical security in a cryptographic system, the attributes of a key must be cryptographically linked to the key at the time the key is generated and must accompany the key during its cryptographic lifetime without tampering. It is, therefore, necessary that the attributes be bound in a secure manner continuously during the following stages: key generation, key storage, key distribution, key usage, and key archiving. Implementations binding attributes to keys that meet all of these objectives may vary in different embodiments of the invention, but it is necessary that such techniques will include forms and combinations of encryption, keyed hashes, MACing or digital signatures.

At the time of key generation, key control attributes are specified. The key control attributes can include, but are not limited to cryptographic algorithms, key usage, and key expiration. Cryptographic algorithms are aplenty and include DES, 3DES, RSA, and DH, for example. Key usage can involve data encryption, password encryption, password verification, digital signature and envelopes, and MAC generation or verification. Key expiration can involve the date and time that a key expires. The present invention, through the use of the control field allows for the identification of these various attributes as necessary.

After a key is created it can be either used within the facility in which it is created or it may be exported to another facility. When used within a secure hardware facility according to an embodiment of the invention, the facility is able to check the key control attributes and determine whether using the key is allowed in a requested function. If a single DES algorithm is requested and the key block is presented, then the facility is able to examine the key control attributes to determine whether the key is allowed for that use within the function. For example, suppose an adversary presents a key for use in a single DES operation. Further suppose this 56-bit key is actually one of two keys intended for use in a triple DES algorithm. The cryptographic system of the present invention is able to examine the key control attributes and determine that the key enclosed in the key block in use is a 3DES key and must not be applied in a weak single DES algorithm. This kind of checking and the ability of the system to exclude a single DES key provides an improved system by protecting the security of all 3DES keys in the cryptographic system. The manner of use of a key can further be controlled by the key control attributes in an embodiment of the invention. For example, the key control attributes allow for the distinction between data encryption keys and password encryption keys (e.g., data encryption and password encryption tasks must be kept separate).

In key distribution, several scenarios are possible that are improved in the cryptographic system of the present invention implementing the disclosed key block. Consider the two scenarios (1) where a key can be sent from a cryptographic facility that is encrypted under a symmetric key exchange key and (2) where a key can also be received that is encrypted under a symmetric key exchange key. Under these scenarios, the key control attributes of the present invention provide important advantages. Even though these keys were not generated within the cryptographic system of the present invention, the controls that are appropriate for these keys must be transmitted with the key. The security of the key control attributes attached to these keys is as strong as if the keys were generated within the receiving facility. Although an adversary may not know a cryptographic key, it is possible that an adversary will try to manipulate the key control attributes in a key block to misuse the key, however, through implementation of the present invention, an adversary cannot attack the key block without invalidating it.

Another scenario occurs when a symmetric key is transmitted while encrypted under a public key. Furthermore, a symmetric key may be received encrypted under a public key. These scenarios are more sensitive and are handled differently in the present invention. This stems from the fact that the adversary knows the public key (i.e., encryption key). This is different than the scenarios previously described in that, here, the adversary knows the key encryption key. The adversary can therefore generate an unlimited number of valid digital envelopes. Any key received in this fashion must not be stored among keys already stored, such as in a key database. In the present invention, keys received in this fashion are restricted for use only as session keys and used only to process data within that session and never stored in the database. These keys are prevented from being used to establish another session with a different user. This requirement can be relaxed for a known sender (e.g., users authenticated through digital signatures). The key control attributes of the present invention also provide for this flexibility through the identification of a trusted sender.

An implemented security policy may dictate that clear text working keys or key exchange keys must not be imported or exported. For example, uncontrolled import of clear keys will generally allow wholesale attacks against all other keys in the system. In some sense, the import of a clear key is more insidious than the ability to export clear keys. The impact of exporting a clear key is obvious. Importing a symmetric key encrypted under a public key (e.g., a digital envelope) without the additional control of a signature or MAC key is no more secure than importing a clear key. The key control attributes of the present invention provide for the proper handling of clear text and key exchange keys through their identification and, in turn, proper handling.

Security personnel must have cryptographic control over the importing or exporting of clear keys. This may be accomplished in several ways. A general description is that an import/export key is identified and loaded as part of the secure hardware facility initialization process. This import/export key is contained within the facility. Security personnel control a copy of this key. The key may be contained in a separate offline hardware facility. Moreover, the key can be under the control of two or more security personnel. A straightforward way to implement this key control is to provide separate key parts to more than one security person. Keys may then be imported/exported only when encrypted under this export key. In this situation, the key control attributes, through the use of the MAC field as described above, are strongly cryptographically coupled to the key at the time it is created. Thus, the adversary is not able to manipulate the attributes. The adversary, therefore, cannot associate a fixed set of attributes with any key other than the original key associated with the specific attributes. The cryptographic system of the present invention is, therefore, able to examine these attributes to determine whether the key qualifies for use in the requested function. Importantly, manipulation of any attributes renders the entire key block invalid through the strong cryptographic coupling of the key control attributes in the control field to the key field through the use of the MAC field as described above.

In an exemplary embodiment of the invention, a control field is implemented as eight bytes (i.e., bytes 0-7) that identify key control attributes. As implemented the byte definitions are shown in the table of FIG. 7. Byte 0 identifies a version of the secure block. As implemented in the present invention, the version is one; thus, byte 0 contains the value "1." Byte 1 contains an attribute for the manner of using the key contained in the encrypted key field. Byte 2 contains an attribute identifying an algorithm for using the key. Byte 3 contains an attribute identifying the mode of using the key. For example, the key may be used for encryption only or EEE only. Byte 4 contains an attribute regarding the exportability of the key. This attribute will be discussed further below. Byte 5 contains an attribute identifying whether padding has been used. In an embodiment, byte 5 is a flag identifying the existence or non-existence of padding. Byte 6 contains attributes identifying any situations necessitating special handling of the keys. Finally, byte 7 contains any other information that may be necessary for the proper handling of encryption keys. Any attempted use of a key in a manner different from the identified attributes is invalid. Accordingly, the system of the present invention prevents the use of a key in a manner inconsistent with the control attributes. The table of FIG. 7 describes an embodiment of the invention, however, one of skill in the art understands that changes can be made without deviating from the invention. For example, the different bytes of the control field may identify different attributes. Moreover, where a different encryption algorithm is used, for example AES, other attributes may be necessary.

Shown in the tables of FIGS. 8A through 8H are exemplary definitions for key control attributes in bytes 0 through 7, respectively, of a control field according to an embodiment of the invention. As described above, byte 0 contains a version of the secure key block being used. As further shown in the table of FIG. 8A, an embodiment of the present invention uses the version attribute "1." The table of FIG. 8B contains the manner of using keys. For example, the attribute definition "A" identifies an ATM master key and the attribute definition "D" identifies data encryption. With regard to the key usage byte, note that the uses work for both symmetric and asymmetric keys. Further note that usage "K" is appropriate for a DES Key Exchange Key (KEK) and an RSA exchange key. As further shown in the table of FIG. 8B, many other attribute definitions are possible. It is important to note that any use inconsistent with this, or any other attribute is invalid and will not be performed in an embodiment of the invention.

Shown in the table of FIG. 8C are the algorithms for using the associated key. For example, the attribute definition "1" identifies the SHA-1 algorithm and "R" identifies the RSA algorithm. Because many other algorithms are possible and because many other algorithms will be developed in the future, other attribute definitions are possible. Shown in the table of FIG. 8D are attribute definitions for the mode of using the keys. For example, the definition "E" identifies encryption only and "D" identifies decryption only. With regard to the mode of use byte, note that DES keys are assumed to be implemented in EDE mode unless some other mode is specified. If there are 16 bytes of key in the encrypted section, it is assumed to be a two-key 3DES implementation. If there are only 8 bytes of key, then it is assumed that all three keys are equal indicating a single DES implementation. As one of skill in the art will understand, other attributes may also be defined as necessary.

Regarding the exportability byte 4 as shown in the table of FIG. 8E, note that non-exportable keys, although not presently widely implemented, can easily be implemented and supported by the present invention. Also note that many cryptographic implementations define exportable as exportable in the clear and sensitive as exportable under any key. The present invention can accommodate these and other definitions. The padding byte 5 as shown in the table of FIG. 8F identifies whether or not padding was used (e.g., "0" for no padding and "1" for padding).

The attributes of the special handling byte 6 shown in the table of FIG. 8G identify those situations not following normal security assumptions. For example, a special handling attribute may identify the degree of trust that can be associated with a key (e.g., high or low). Generally, any identification of a special handling attribute should signal the careful handling of the key block. Finally, byte 7 as shown in the table of FIG. 8H identifies any other information that may be necessary to properly handle the keys.

Note that in the tables of FIGS. 8A through 8H, the attributes are denoted with an ASCII character which can be used to readily understand the various attributes. Moreover, their corresponding hexadecimal representation (not shown) can also be used to readily understand the values of the various attributes.

Figure 1B:
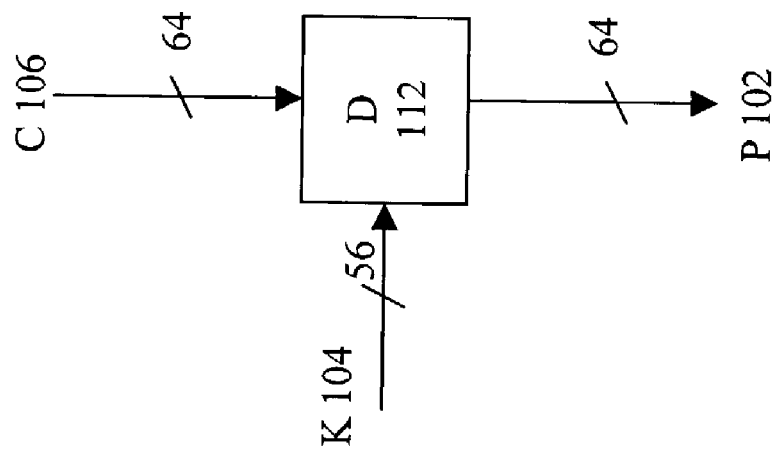
FIG. 1B is a block diagram depicting the implementation of single DES decryption according to the prior art.
Figure 1A:
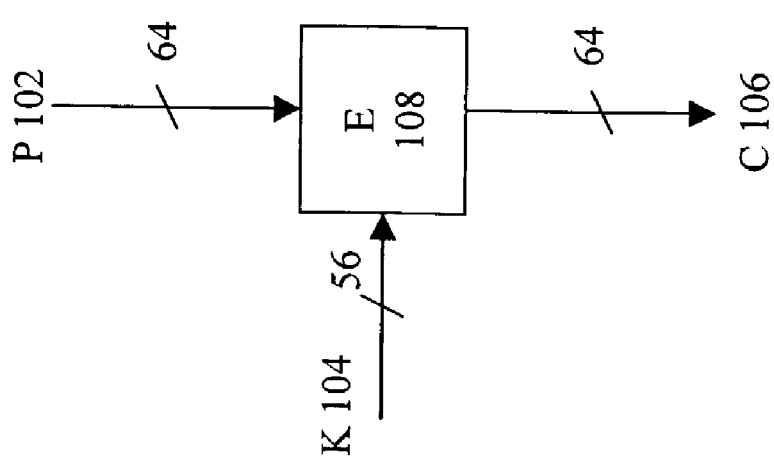
FIG. 1A is a block diagram depicting the implementation of single DES encryption according to the prior art.
Figure 2B:
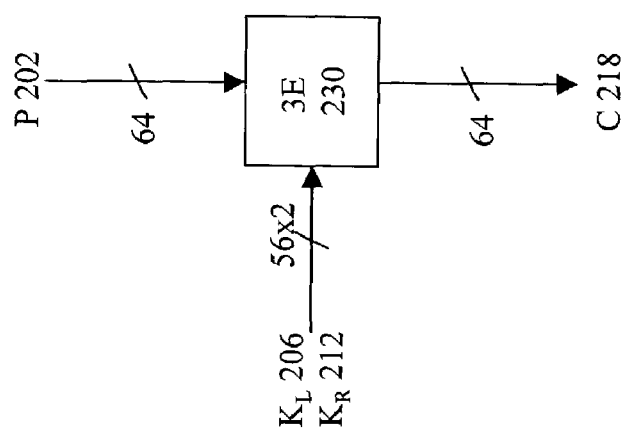
FIG. 2B is a simplified block diagram depicting the implementation of triple DES encryption according to the prior art.
Figure 2A:
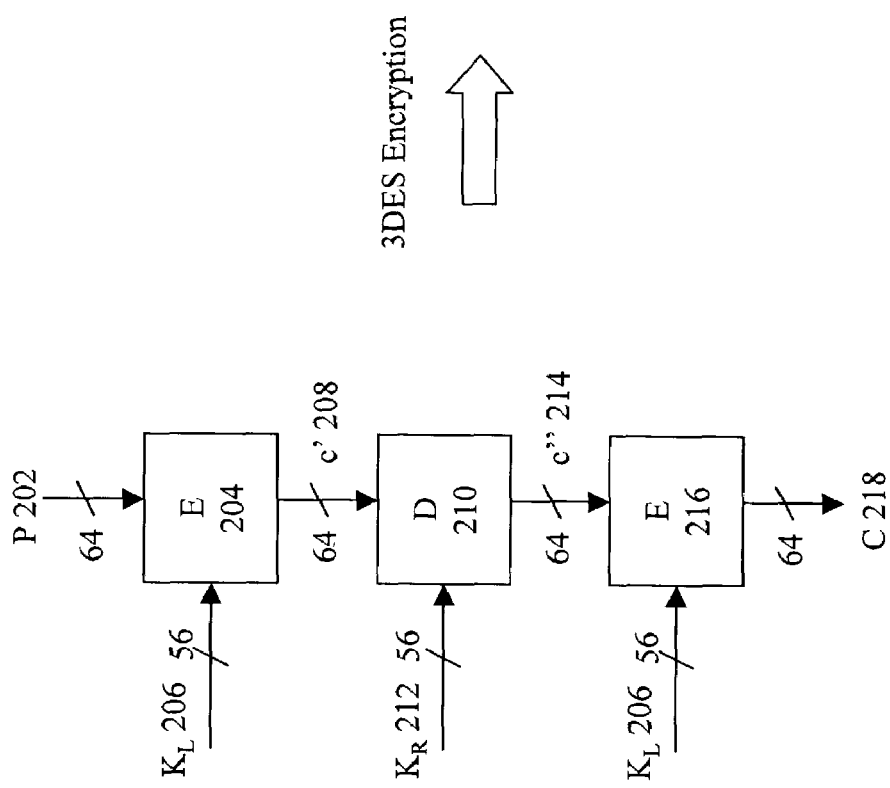
FIG. 2A is a block diagram depicting the implementation of triple DES encryption according to the prior art.

Turning now to the key field, recall that in an embodiment, the key field is divided into three equal parts that can accommodate one, two, or three DES keys. Further recall that where one or two DES keys are implemented, padding is also implemented. The encryption scheme is a triple DES algorithm as shown in FIG. 2 implemented in CBC mode. In an embodiment using a key exchange key (KEK), a key exchange key is XORed with "EEEEEEEE." Note that a double length KEK for encryption is sufficient for security, but 24 byte DES keys are used in the embodiment being described such that in adhering to FIPS 140-1, KEK should properly be 48 hex. Regardless of the KEK used, the same constant, "EEEEEEEE," should be implemented.

Where padding is necessary, an embodiment uses PKCS 5 where it sets the padding number to the number of padding bytes. For example, where 4 bytes of padding are necessary, the value of each of those bytes will be 0x33 04. Distinctly from PKCS 5, the present embodiment does not determine the maximum length of the padding from the block size. In this manner, the present embodiment is able to pad several block lengths to disguise vulnerable keys. In the embodiment being described, the minimum padded size for various symmetric algorithms may be different. For DES, RC2, and RC4, a minimum of 48 hex is required. For AES, a minimum of 32 hex is required.

With regard to the MAC algorithm, the present embodiment implements a CBC MAC using EDE (i.e., encrypt-decrypt-encrypt) mode 3DES as the block cipher. In an embodiment using KEK, the key is XORed with offset "MMMMMMMM." Moreover, as previously described, the MAC is across the encrypted key block including the control field. In the present embodiment, if the key block is not a multiple of eight bytes, it is padded at the end with zeros before applying the MAC algorithm. In this embodiment of the invention, the MAC field is 8 bytes long (i.e., 16 hexadecimal characters).

The present invention provides several advantages with regard to the control and management of cryptographic keys cached or stored in a server environment. Many advantages are described relative to security, efficiency, ease of use, and acceptance in legacy environments, flexibility and extensibility. For example, the present invention:

prevents adversary from being able to change any of the attributes of the key;
prevents an adversary from changing any bits of a key in use;
prevents an adversary from using part of a key in use as the entire key;
prevents an adversary from substituting parts of one key for another key, or from copying parts of one key into itself, or from rearranging any part of a key;
prevents leaking of any information about any keys even if the encrypted information contains known information;
prevent the identification of the use of weaker keys; and
prevent contamination of any keys even upon the discovery of a working key.

Thus, the present invention provides a high work factor and further removes any attack mechanism an adversary may contemplate. Thus, in the present invention, keys used to protect another key provide equal or greater in strength than the key being protected. Moreover, the key block of the present invention is compact while providing much functionality. Thus, the processing of the key block of the present invention can be achieved in a fast and efficient manner.

Advantageously, the key block of the present invention in using a control field, a key field, and a MAC field, applies known and understood elements. By aligning key control attributes at byte boundaries, attributes are represented by printable constants (e.g., ASCII characters) with a direct relation to an attribute. Moreover, the key block of the present invention supports FIPS 140-1 level 4 compliance in a secure hardware facility. Furthermore, the key block of the present invention is expandable to allow the addition of new types of key properties in the future as well as new algorithms, key lengths, and uses. In fact, the key block of the present invention is flexible enough to allow different cryptographic protection mechanisms. For example, the present invention allows for the straightforward migration from 3DES to AES.

In the embodiments of the invention described above, the integrity of the key block was assured through application of a MAC algorithm, however, in other embodiments of the invention shown in FIGS. 9 through 17, the integrity of the key block and its contents is assured through application of keyed hash functions. In these embodiments, a hash field is computed wherein it is computationally infeasible to find two distinct inputs that produce the same hash field. These embodiments provide a computational advantage when a hash function is less computationally intensive than a block cipher such as 3DES, but maintain security by providing strong and unique binding of the different parts of the secure key block. It should nevertheless be considered that to the resulting hash field may be required to be large in order to assure the integrity of the key block.

Figure 9:
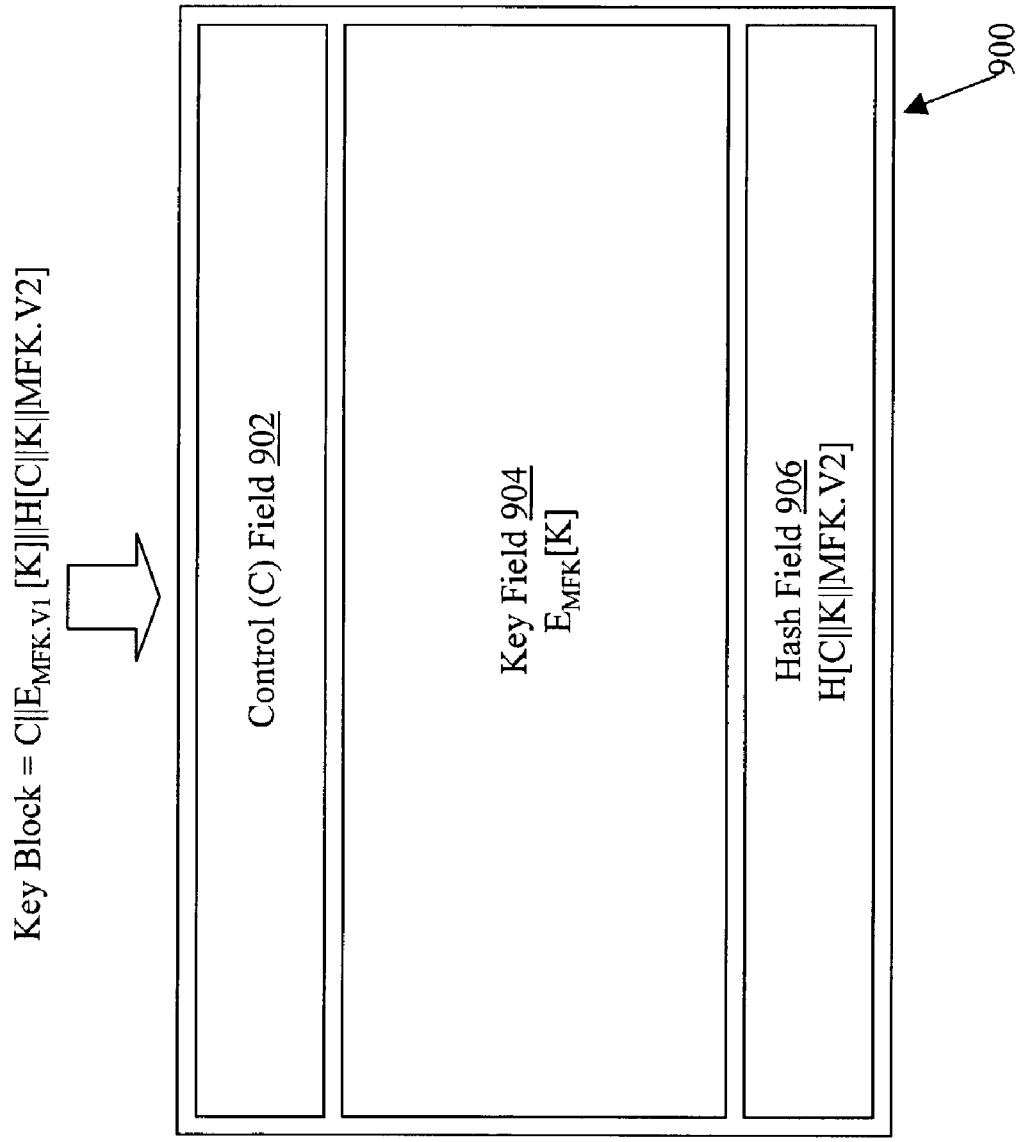
FIG. 9 is a block diagram representation of a key block having a control field, a key field and a hash field according to an embodiment of the present invention.

Shown in FIG. 9 is a secure key block 900 according to another embodiment of the invention. Secure key block 900 is similar to secure key block 400 of FIG. 4 with regard to the control field 902 which is similar to control field 402 and key field 904 which is similar to key field 404, but differs in that a keyed hash field 906 is used with a first variant of the master file key, MFK.V1, instead of a MAC field 406. The hash field 906 is generated by application of computationally efficient functions that map binary strings of arbitrary length to binary strings of a fixed length. A variant MFK.V2 of the strong MFK is included in the hash to ensure a high work factor even with single-length keys K. Because hash field 906 is not encrypted, it may be appropriate to use a large hash size thus leading to a larger key block size.

Figure 10:
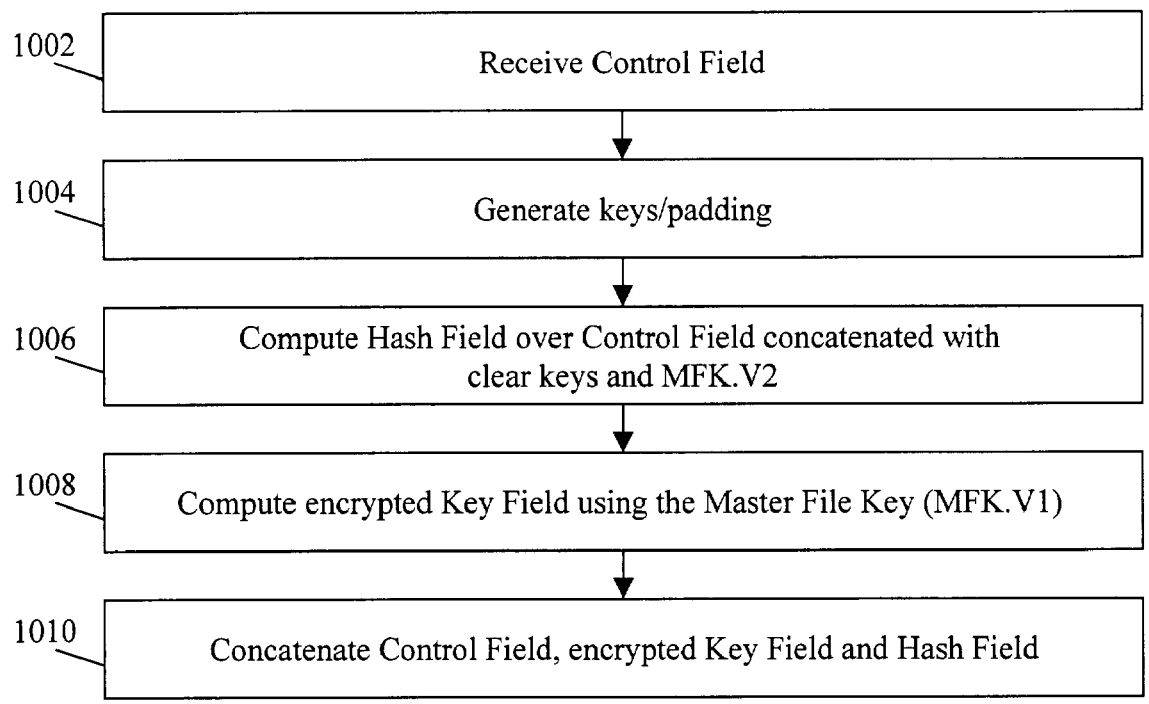
FIG. 10 is a flow block of a method for generating the key block according to an embodiment of the present invention.

A method for generating secure key block 900 is shown in FIG. 10. As shown, a control field containing the necessary attributes for handling a cryptographic key is generated at step 1002. Any cryptographic keys and/or padding are received at block 1004. At step 1006, a hash field is computed by applying a hash function over the control field and the clear keys with padding if any, and a variant MFK.V2 of the MFK. At step 1008, the keys and/or padding are encrypted using a variant MFK.V1 of the master file key (MFK). The control, encrypted key, and hash fields are then concatenated as a secure key block at step 1010. Note that in this embodiment, the use of a master file key (MFK) is described. One of skill in the art, however, will recognize that a key encryption key (KEK) can similarly be used for applications including key transmissions.

Figure 11:
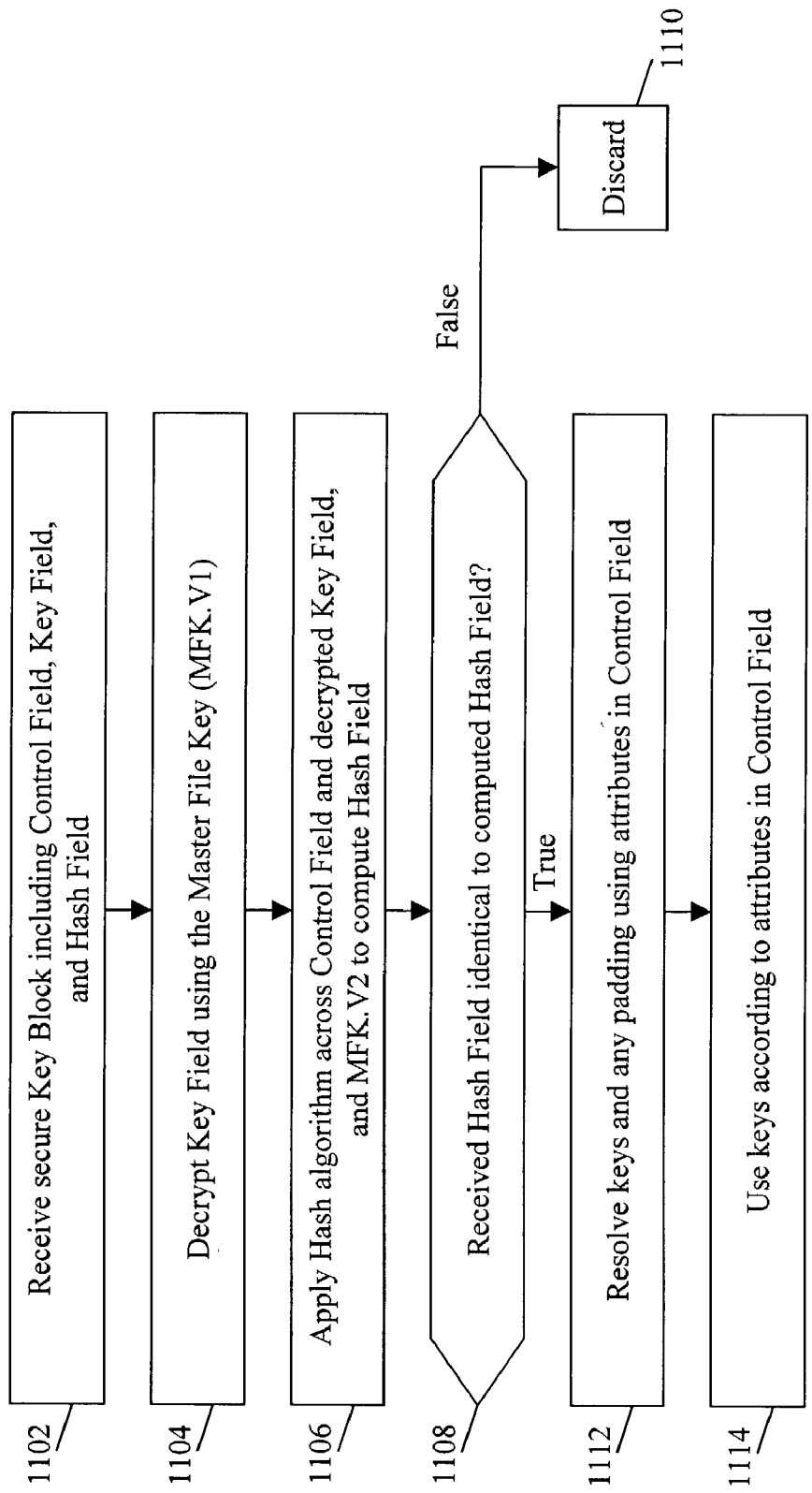
FIG. 11 is a flow block of a method for validating the key block according to an embodiment of the present invention.

Shown in FIG. 11 is a flow block of a method for validating the key block 900 of the present invention. As shown in FIG. 11, the secure key block is received at step 1102 where the secure key block includes a control field, a key field and a MAC field. The key field is decrypted using the master file key (MFK) variant MFK.V1 at step 1104 to generate the decrypted keys. At step 1106, the hash function is applied across the received control field, and decrypted keys, and MFK variant MFK.V2 to compute a hash field. Thereupon, at step 1108, the received hash field is compared to the computed hash field. If the fields do not match the key block is discarded at step 1160. Because the hash fields do not match, no information contained within the key block can be trusted. If the hash fields match, step 1162 is performed. At step 1162, the decrypted keys and any padding are resolved using attributes contained in the control field. Moreover, other attribute information contained within the control field can further be applied at step 1164. Further checks can be applied at step 1164 to ensure the proper use of the keys. For example, any attempted misuse of the keys can immediately lead to terminating the requested operation.

Importantly, the methods of FIGS. 10 and 11, as well as other methods described herein, can be used in combination. For example, the method of FIG. 11 can be used to validate a key encapsulated within a secure key block by using a first key, e.g., an MFK. Upon validation, the method of FIG. 10 can be implemented to in turn encapsulate the validated key in another key block using second key, e.g., a KEK. Many other combinations are possible as would be understood by one of skill in the art upon understanding the present disclosure.

Figure 12:
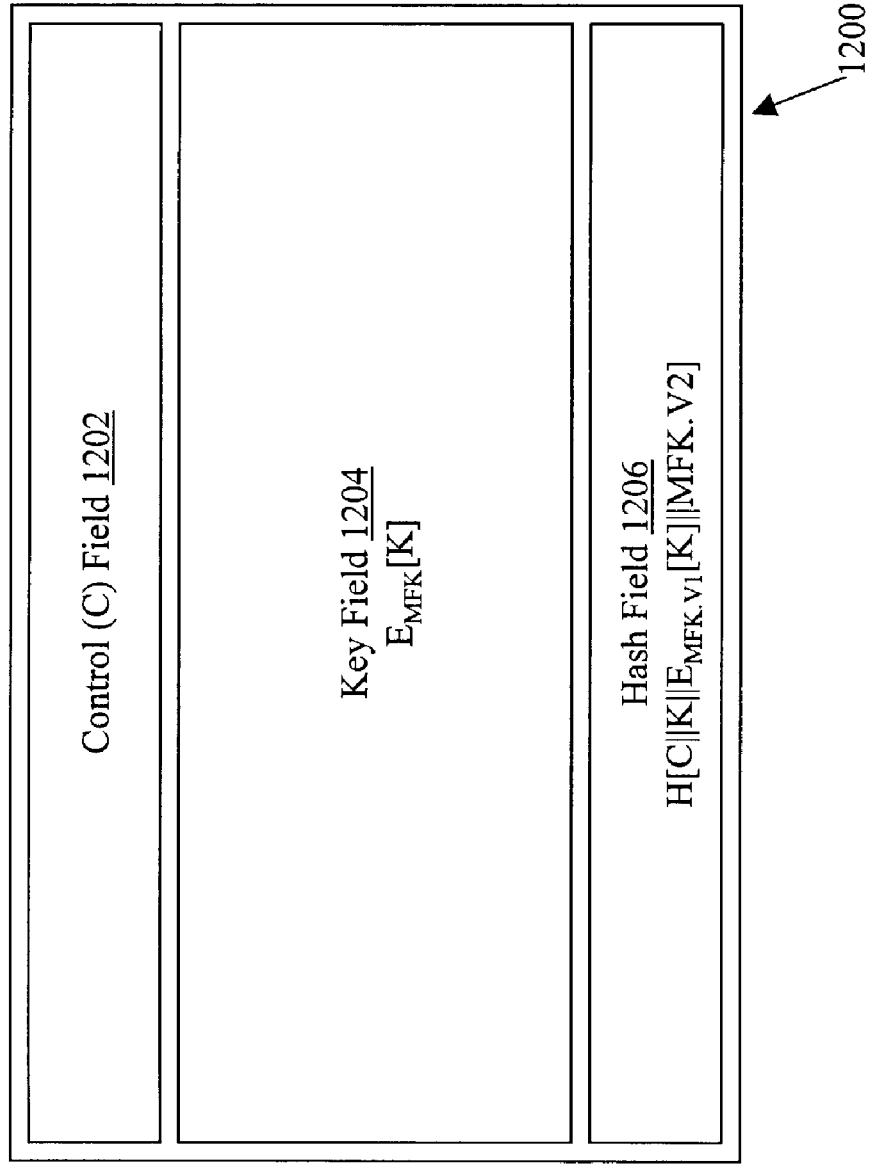
FIG. 12 is a block diagram representation of a key block having a control field, a key field and a hash field according to an embodiment of the present invention.

Shown in FIG. 12 is a secure key block 1200 according to another embodiment of the invention that applies a hash function in a different manner than in key block 900 of FIG. 9. Whereas hash field 906 of FIG. 9 was generated by application of a hash function across the control field, the unencrypted key field, and the first variant MFK.V1, hash field 1206 is generated by application a hash function across the control field, the clear keys, the encrypted key field, and a second variant MFK.V2.

Figure 13:
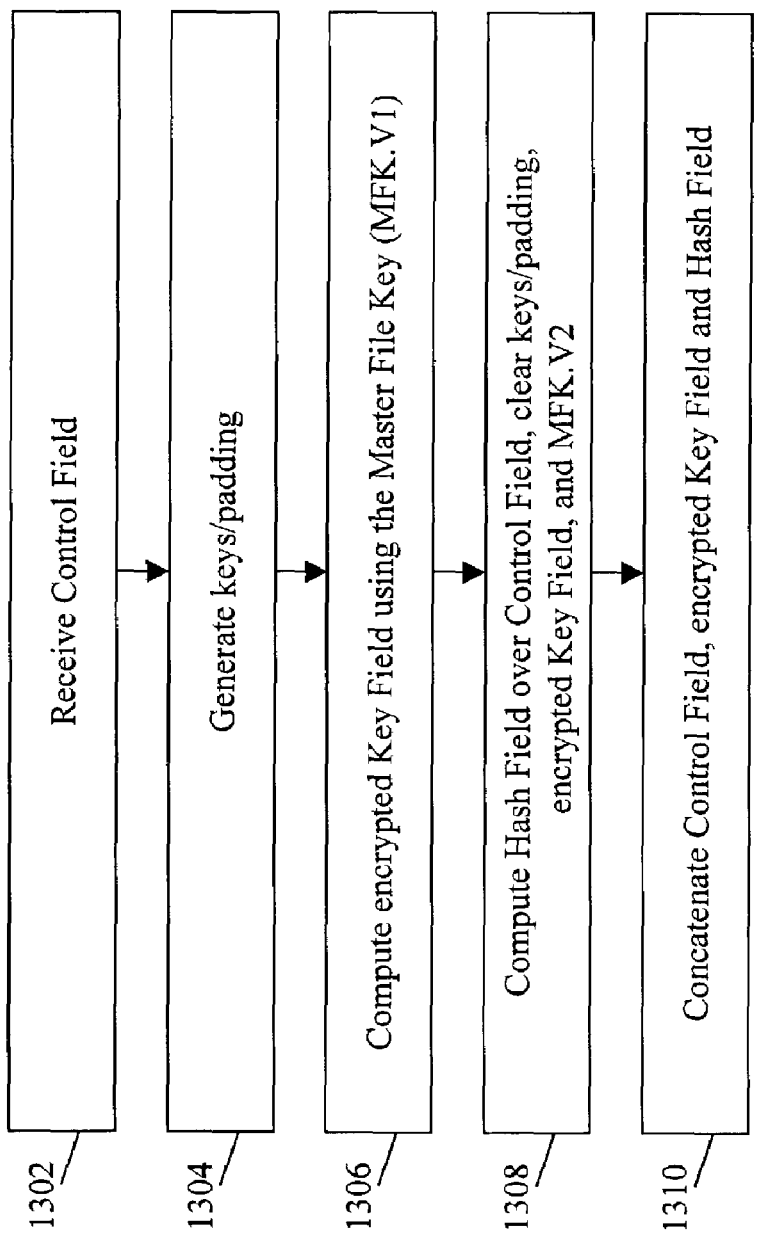
FIG. 13 is a flow block of a method for generating the key block according to an embodiment of the present invention.

A method for generating secure key block 1200 is shown in FIG. 13. As shown, a control field containing the necessary attributes for handling a cryptographic key is generated at step 1302. Any cryptographic keys and/or padding are received at block 1304. At step 1306, the keys and padding, if any, are encrypted using the master file key (MFK) variant MFK.V1 to generate the encrypted key field. At step 1308, a hash field is computed by applying a hash function across the control field, the clear keys and padding, if any, the encrypted key field, and MFK variant MFK.V2. The control, encrypted key, and hash fields are then concatenated as a secure key block at step 1310. In this embodiment of the invention, the hash function covers the control field, the clear keys, the encrypted key field, and an MFK variant such that the hash field cannot be attacked. Moreover, the hash field cannot leak information to an adversary. It is important to note that, although it is over a larger amount of data thereby generating a large field, the hash field can be truncated to a reasonable size, such as the size of MAC field 406 of FIG. 4, without a deterioration of security. Note that in this embodiment, the use of a master file key (MFK) is described. One of skill in the art, however, will recognize that a key encryption key (KEK) can also be used similarly.

Figure 14:
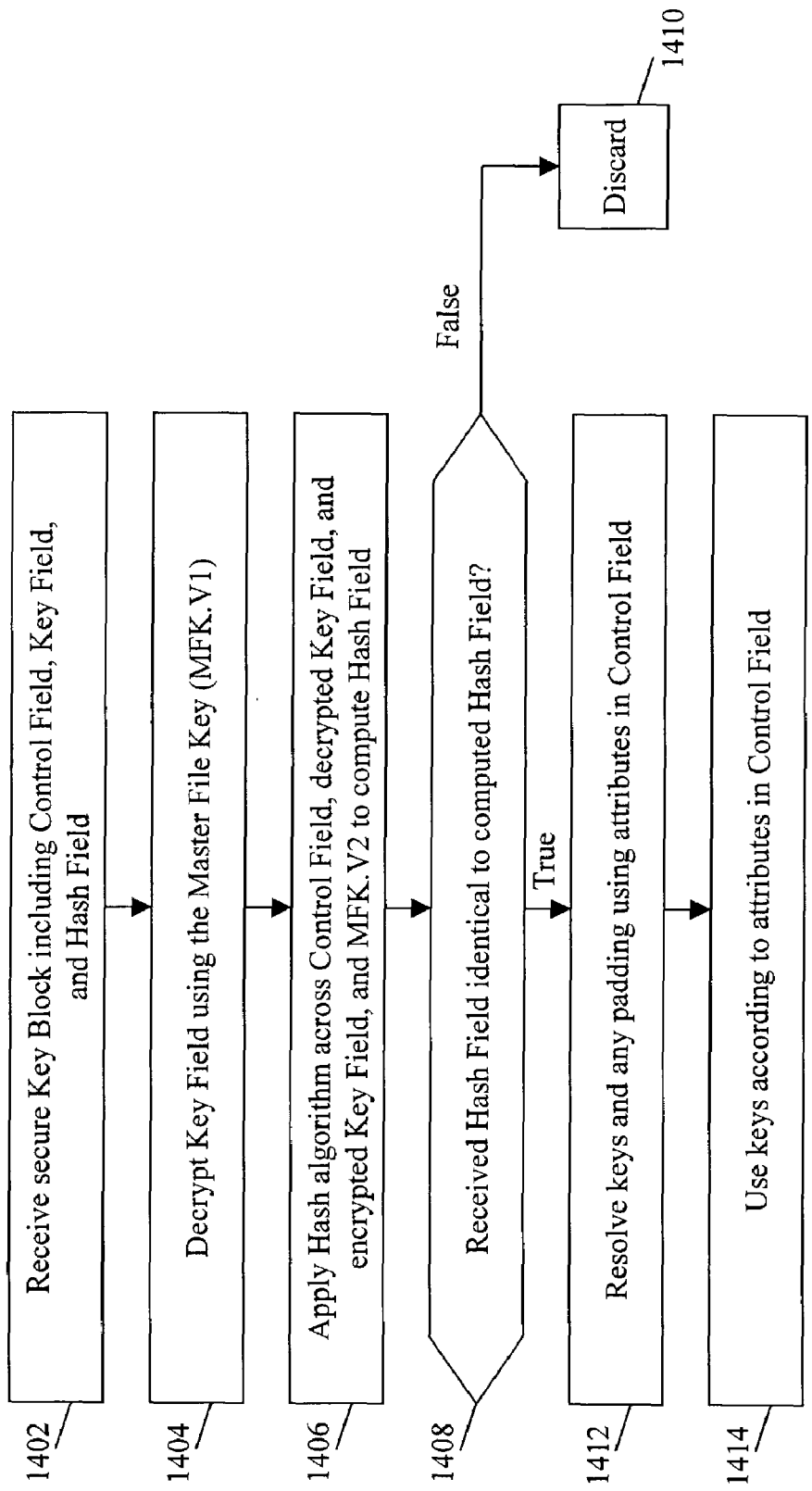
FIG. 14 is a flow block of a method for validating the key block according to an embodiment of the present invention.

Shown in FIG. 14 is a flow block of a method for validating the key block 1200 of the present invention. As shown in FIG. 14, the secure key block is received at step 1402 where the secure key block includes a control field, a key field and a hash field. The key field is decrypted using the master file key MFK.V1 at step 1404 to generate the clear keys. At step 1406, the hash function is applied across the received control field, the decrypted keys, the received encrypted key field, and MFK.V2 to compute a hash field. Thereupon, at step 1408, the received hash field is compared to the computed hash field. If the fields do not match the key block is discarded at step 1410. Because the hash fields do not match, the keys contained within the key block cannot be trusted. If the hash fields match, step 1412 is performed. At step 1412, the decrypted keys and any padding are resolved using attributes contained in the control field. Moreover, other attribute information contained within the control field can further be applied at step 1414. Further checks can be applied at step 1414 to ensure the proper use of the keys. For example, any attempted misuse of the keys can immediately lead to terminating the requested operation.

Importantly, the methods of FIGS. 13 and 14, as well as other methods described herein, can be used in combination. For example, the method of FIG. 14 can be used to validate a key encapsulated within a secure key block by using a first key, e.g., an MFK. Upon validation, the method of FIG. 13 can be implemented to in turn encapsulate the validated key in another key block using second key, e.g., a KEK. Many other combinations are possible as would be understood by one of skill in the art upon understanding the present disclosure.

Figure 15:
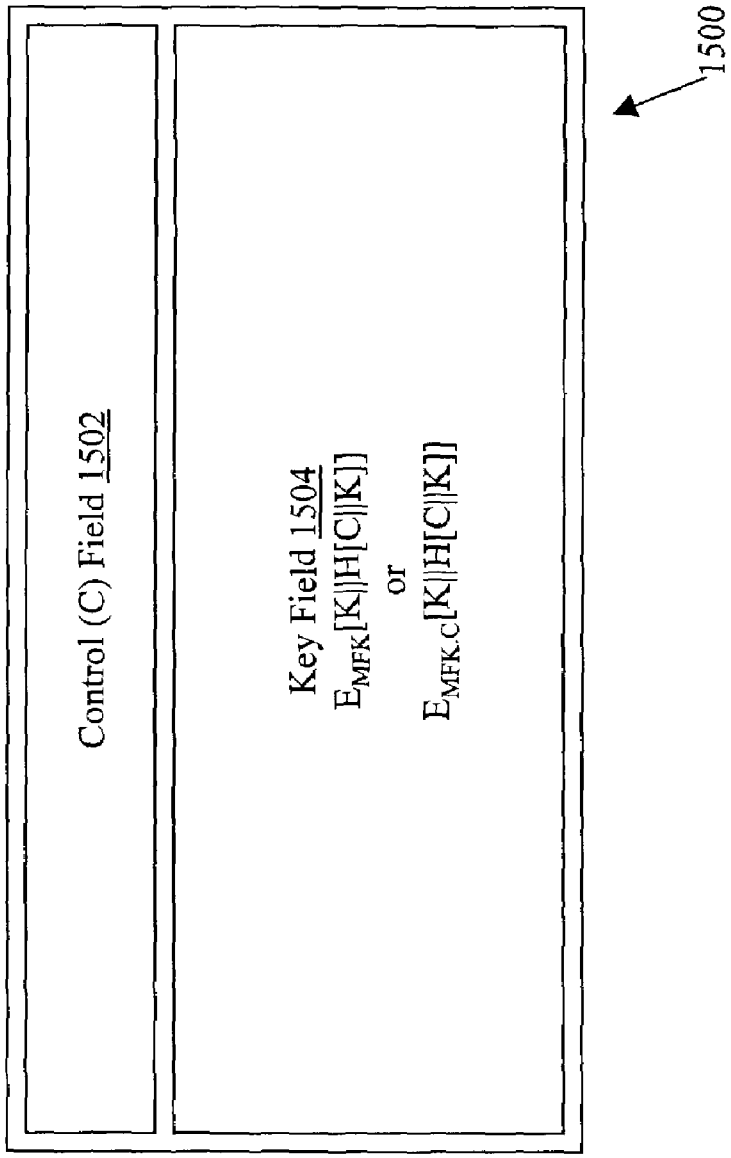
FIG. 15 is a block diagram representation of a key block having a control field and an encrypted field according to an embodiment of the present invention.

Yet another key block 1500 according to the present invention is shown in FIG. 15. Notably, key block 1500 does not contain a distinct hash field, but does combine an encrypted hash field within key field 1504. Key field 1504 contains within it an encrypted hash field computed across the control field and the clear keys. The hash field therefore strongly binds the control field and the clear keys such that tampering of key block 1500 can be detected. Key field 1504 further contains encrypted keys and padding, if any.

Figure 16:
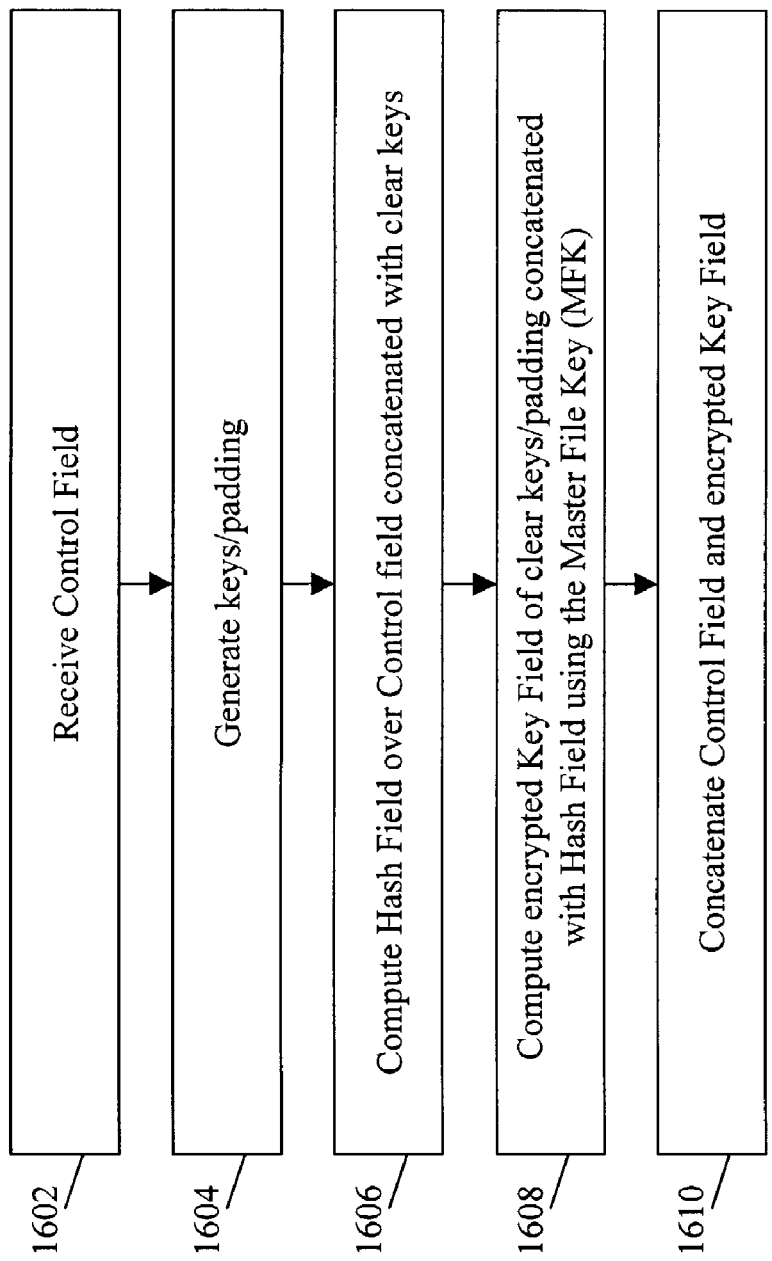
FIG. 16 is a flow block of a method for generating the key block according to an embodiment of the present invention.

A method for generating secure key block 1500 is shown in FIG. 16. As shown, a control field containing the necessary attributes for handling a cryptographic key is generated at step 1602. Any cryptographic keys and/or padding are received at block 1604. At step 1606, a hash function is applied across the clear keys and padding, if any, to generate a hash field. At step 1608, an encrypted key field is computed by encrypting the clear keys (and padding, if any) concatenated with the hash field using the master file key (MFK). The control field and encrypted key field are then concatenated as a secure key block at step 1610. If a fast hash function is available, this embodiment may be advantageous because, since the hash function is encrypted, it can be truncated (to the size of MAC field 406 of FIG. 4 for example) without a deterioration in security. Thus, key block 1500 of FIG. 15 is computationally more efficient to generate and can be the same size as key block 400 of FIG. 4. In this embodiment, the use of a master file key (MFK) is described. One of skill in the art, however, will recognize that a key encryption key (KEK) can also be used.

Figure 17:
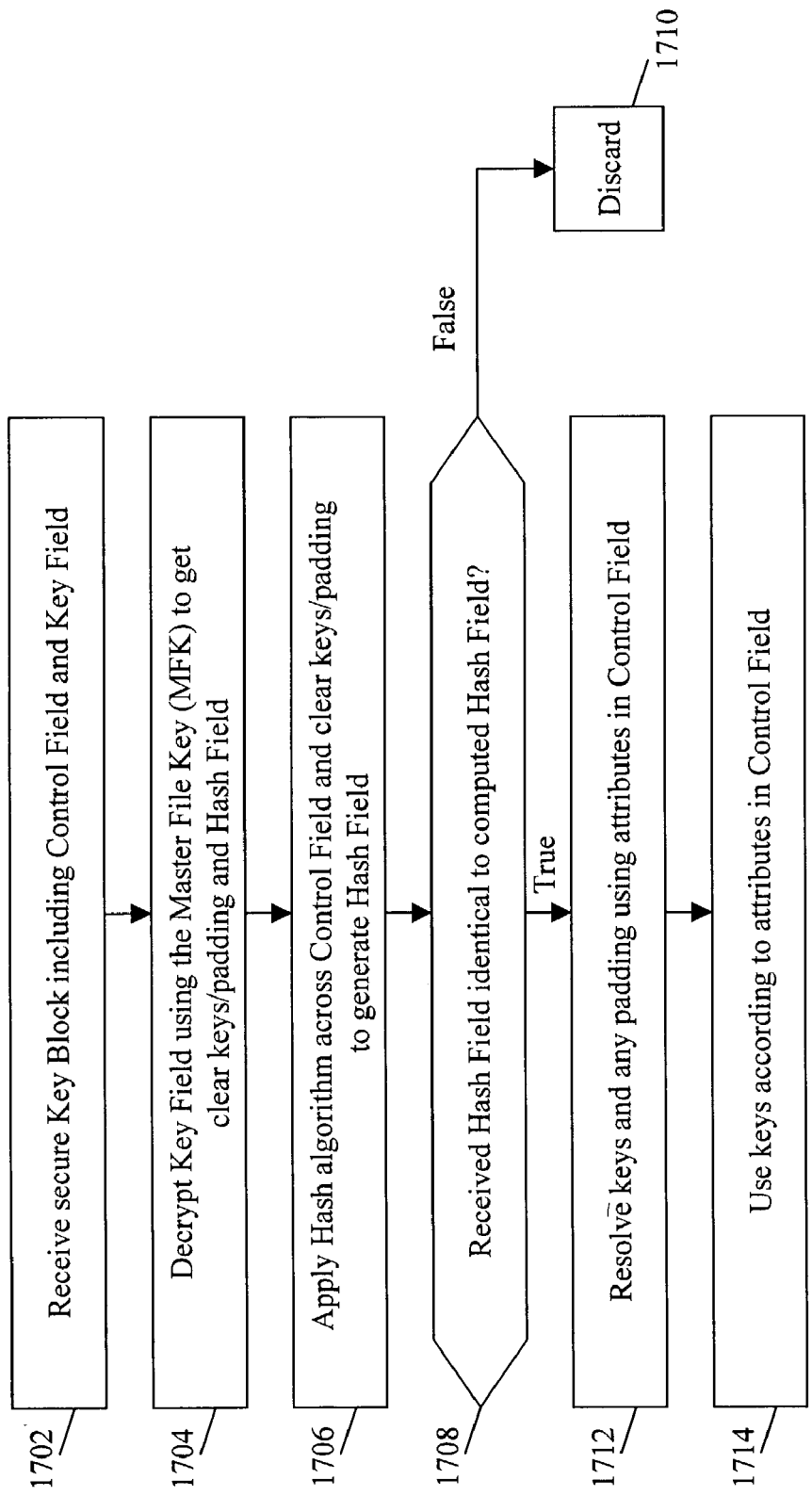
FIG. 17 is a flow block of a method for validating the key block according to an embodiment of the present invention.

Shown in FIG. 17 is a flow block of a method for validating the key block 1500 of the present invention. As shown in FIG. 17, the secure key block is received at step 1702 where the secure key block includes a control field and a key field. The key field is decrypted using the master file key at step 1704 to generate the clear keys (and padding, if any) and the hash field. At step 1706, the hash function is applied across the received control field and the decrypted clear keys to compute a hash field. Thereupon, at step 1708, the received and decrypted hash field is compared to the computed hash field. If the fields do not match the key block is discarded at step 1710. Because the hash fields do not match, the keys contained within the key block cannot be trusted. If the hash fields match, step 1712 is performed. At step 1712, the decrypted keys and any padding are resolved using attributes contained in the control field. Moreover, other attribute information contained within the control field can further be applied at step 1714. Further checks, can be applied at step 1714 to ensure the proper use of the keys. For example, any attempted misuse of the keys can immediately lead to terminating the requested operation.

Importantly, the methods of FIGS. 16 and 17, as well as other methods described herein, can be used in combination. For example, the method of FIG. 17 can be used to validate a key encapsulated within a secure key block by using a first key, e.g., an MFK. Upon validation, the method of FIG. 16 can be implemented to in turn encapsulate the validated key in another key block using second key, e.g., a KEK. Many other combinations are possible as would be understood by one of skill in the art upon understanding the present disclosure.

In yet another embodiment of the invention, variants of the master file key (MFK) are generated by using the control field to create a variant of the master file key (e.g., MFK.C). For example, a variant can be created by applying an XOR function to the MFK and control field (C) to generate MFK.C. In applying this concept to key block 1500 of FIG. 15, the control field, clear keys, and encrypted keys are not only bound together, but the MFK is also advantageously masked. This manner of generating a variant can also be applied to other keys such as key exchange keys (KEK).

An important application of the present invention is the secure exchange (transmission and receipt) of keys with other systems and cryptographic devices over a network. Secure key exchanges are enabled by key exchange keys (KEKs). Each particular KEK is a secret shared only by a particular pair of systems. Each holder of a KEK must protect it within a security module, or protect it within a secure key block when it resides outside the security module in local storage, for example. Since the number of KEKs in use may be very large, they are often protected and stored in local storage in the same manner as other keys.

Figure 18:
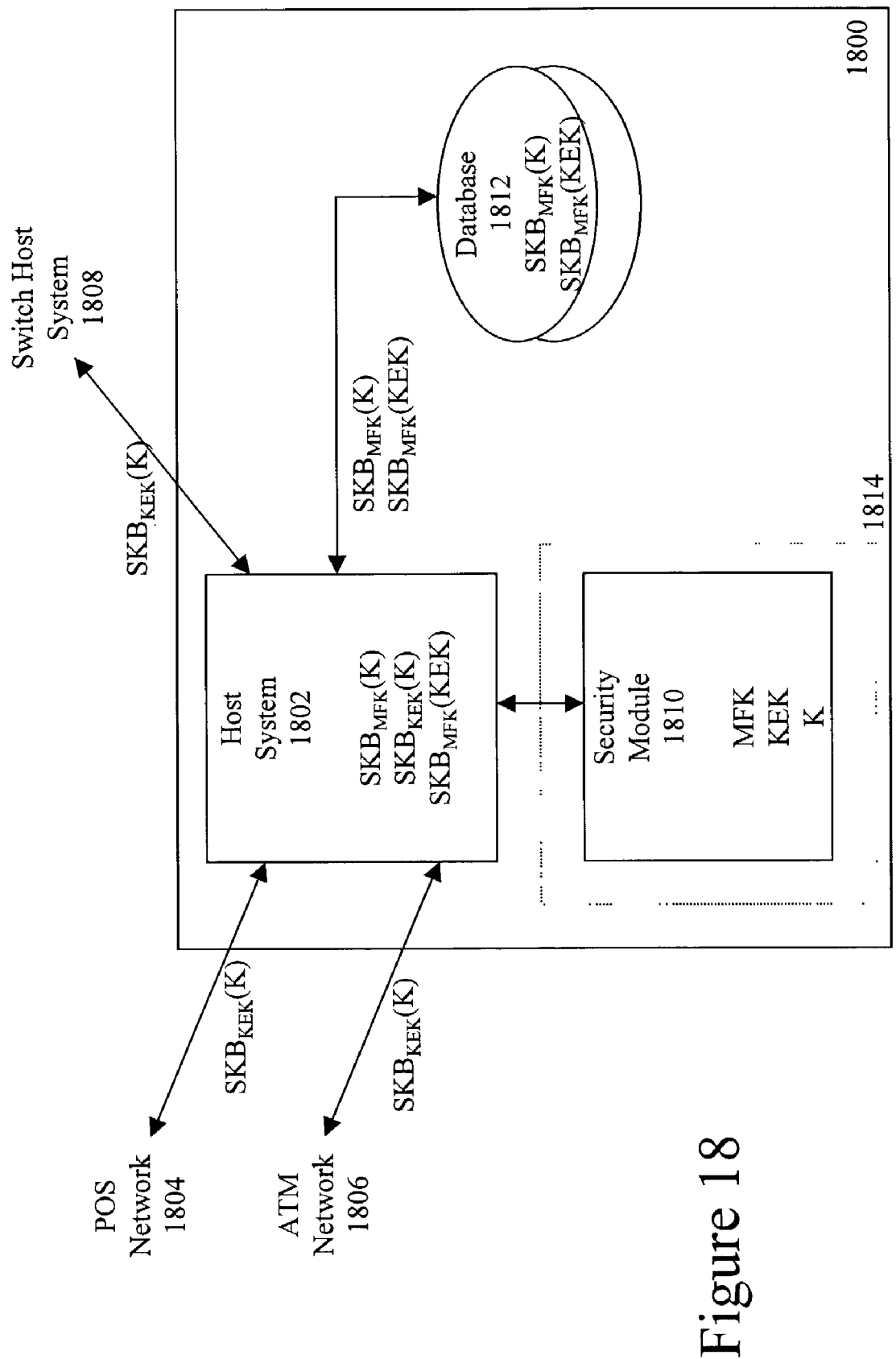
FIG. 18 is a block diagram depicting a cryptographic system having a host system, a database, and a security module.

FIG. 18 illustrates a cryptographic system 1800 and the application of secure key blocks (SKBs) for key exchange operations according to an embodiment of the present invention. The local database 1812 contains secure key blocks protecting both KEKs and other keys. The host system 1802 controls the flow of SKBs to the security module 1810, to the database 1812, and to other systems and devices 1808, 1804, and 1806. The security module creates, verifies, and translates SKBs as directed by the host and subject to associated key controls but in no case exposes MFKs, KEKs, or other keys outside its security boundary 1814.

Figure 19:
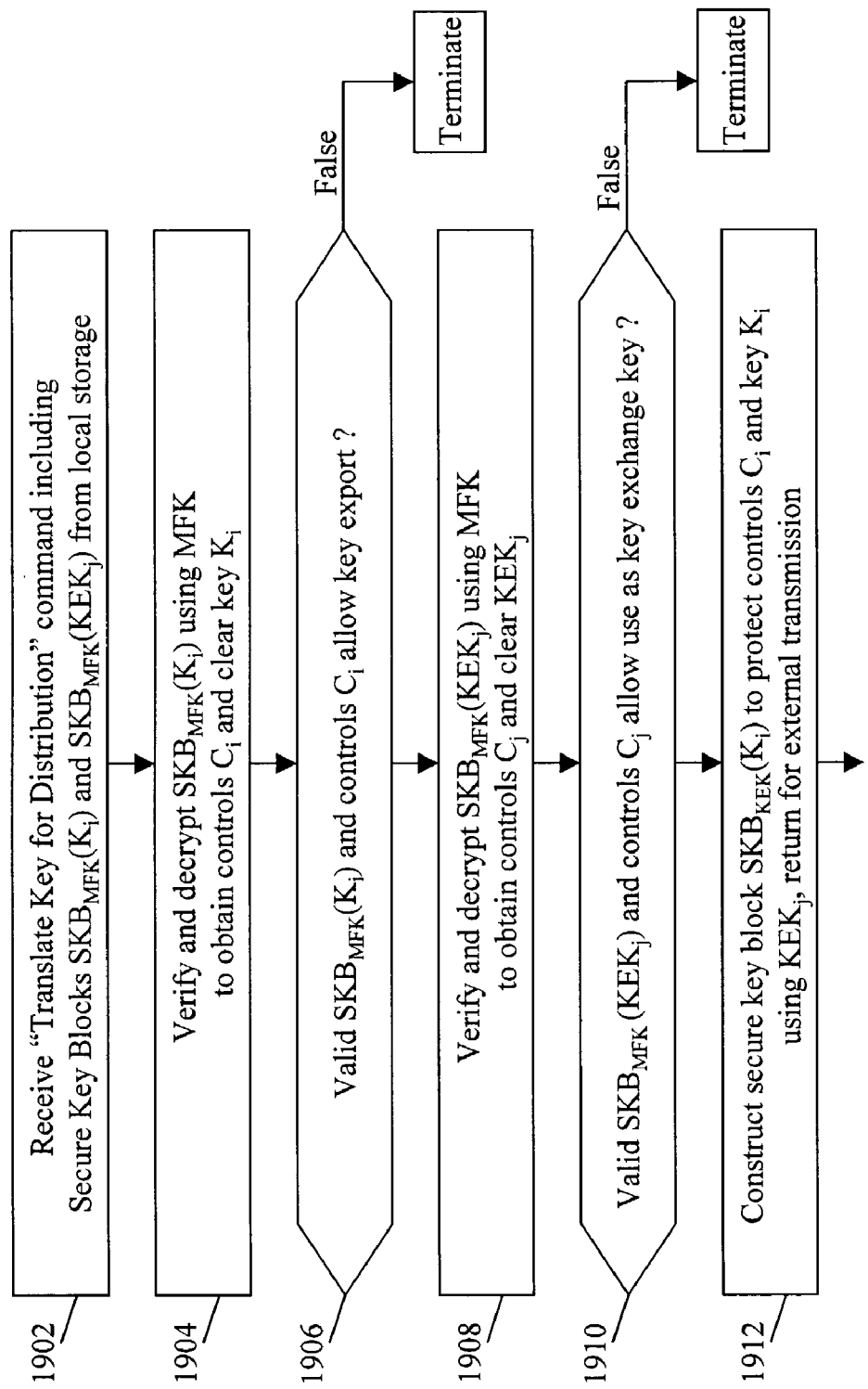
FIG. 19 is a flow block of a method for securely translating a secure key block from local storage into a secure key block for external transmission under a key exchange key according to an embodiment of the present invention.

A method for securely translating a secure key block from local storage into a secure key block for external transmission under a key exchange key is illustrated in FIG. 19. As shown, at step 1902, a command "Translate Key for Distribution" is received including two secure key blocks from local storage protecting the key $K_i$ to be translated and the $KEK_j$ to be used, respectively. At step 1904 the SKB containing $K_i$ is verified and decrypted under the MFK as described previously. At step 1906, if either the SKB was invalid or the key control attributes $C_i$ do not allow key export, the operation terminates the SKB containing $KEK_j$ is verified and decrypted under the MFK as described previously at step 1908. At step 1910, if either the SKB was invalid, or the key control attributes $C_j$ do not allow use as a key exchange key, the operation terminates. At step 1912, a new secure key block protecting $K_j$ and its associated controls $C_i$ is constructed using $KEK_j$ as described previously, and the resulting SKB is returned to the host for external transmission.

Figure 20:
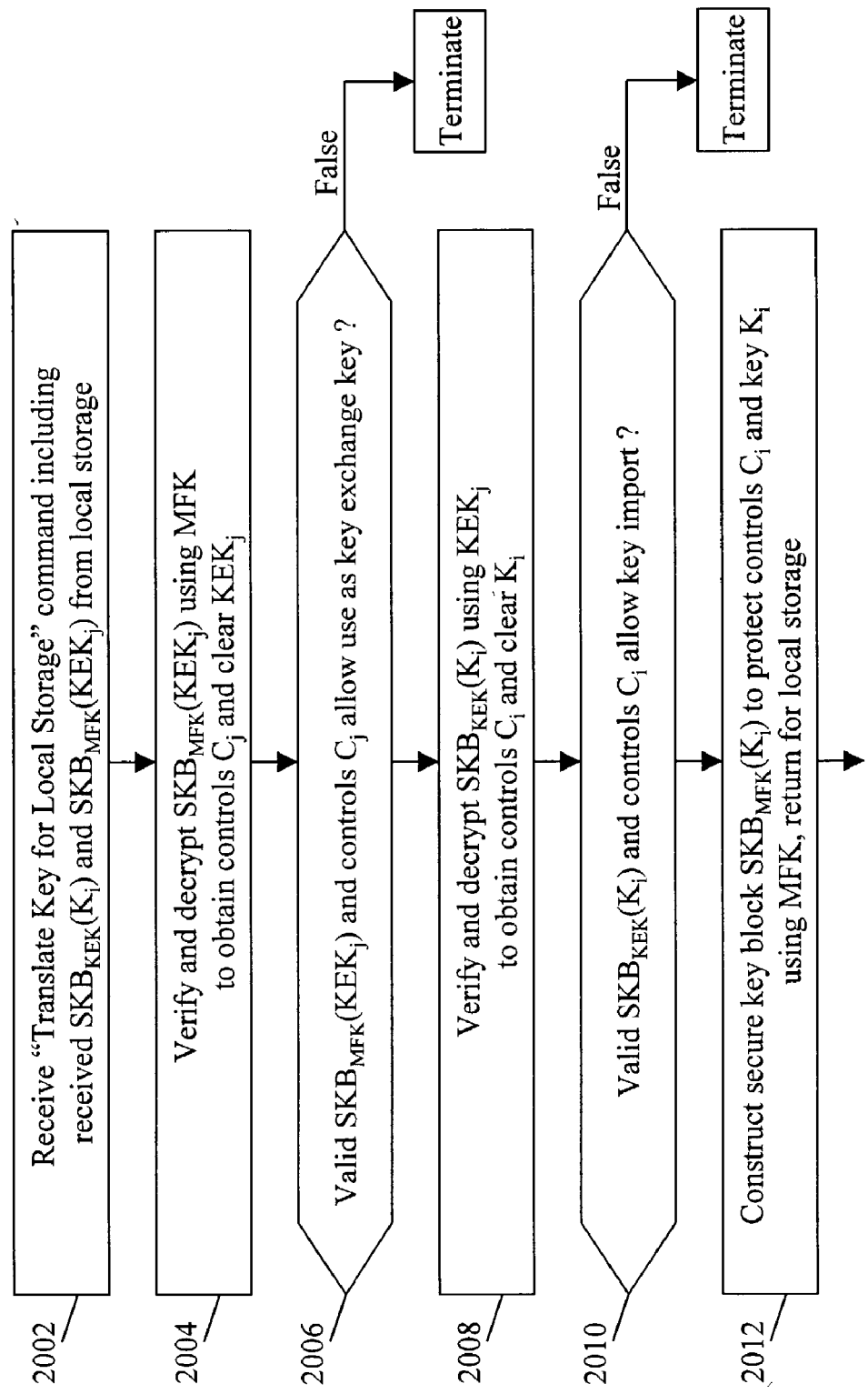
FIG. 20 is a flow block of a method for securely translating a secure key block received externally under a key exchange key into a secure key block for local storage according to an embodiment of the present invention.

A method for securely translating a secure key block received under a key exchange key into a secure key block for local storage is illustrated in FIG. 20. As shown, at step 2002, a command "Translate Key for Local Storage" is received including two SKBs, the first SKB a received block protecting a key $K_i$ and the second SKB from local storage protecting the $KEK_j$ to be used. At step 2004, the SKB containing $KEK_j$ is verified and decrypted under the MFK as described previously. At step 2006, if either the SKB was invalid, or the key control attributes $C_j$ do not allow use as a key exchange key, the operation terminates. At step 2008, the received SKB containing $K_i$ is verified and decrypted under the $KEK_j$ as described previously. In step 2010 if either the SKB was invalid, or the key control attributes $C_i$ do not allow key import, the operation terminates. In step 2012, a new secure key block protecting $K_i$ and its associated controls $C_i$ is constructed using the MFK as described previously, and the resulting SKB is returned to the host for local storage.

While various embodiments and advantages of the present invention have been described, it will be recognized that a number of variations will be readily apparent. For example, in using the term master file key (MFK), one of skill in the art understands its broad definition. Thus, the present teachings may be widely applied consistent with the foregoing disclosure and the claims which follow.

What is claimed is:

1. A method for validating a received secure key block, comprising:
    applying, by a cryptographic system, a hash algorithm across a concatenation of a control field, an encrypted key field, and a first variant of a key-encrypting key to create a computed hash field, wherein the control field and the encrypted key field are contained within a received secure key block;
    validating, by the cryptographic system, the secure key block if a received hash field is equal to the computed hash field, wherein the received hash field is contained within the received secure key block; and
    for a validated secure key block, decrypting, by the cryptographic system, the encrypted key field to reveal at least one clear key using the key-encrypting key.

2. The method of claim 1, wherein decrypting the encrypted key field includes the steps of:
    obtaining the key-encrypting key,
    generating a second variant of the key-encrypting key through application of a variant offset value, and
    using the second variant of the key-encrypting key as a decryption key to decrypt the encrypted key field.

3. The method of claim 1, wherein decrypting the encrypted key field uses a triple DES algorithm.

4. The method of claim 1, wherein the decryption algorithm is an AES algorithm.

5. The method of claim 1, wherein the encrypted key field includes an encrypted form of the at least one clear key.

6. The method of claim 5, wherein the encrypted key field includes an encrypted pad.

7. The method of claim 1, wherein the control field includes attributes of the at least one clear key contained within the encrypted key field.

8. The method of claim 1, wherein tampering with the secure key block renders the received hash field unequal to the computed hash field.

9. The method of claim 1, wherein use of the at least one clear key in a manner inconsistent with attributes identified in the control field is disallowed.

10. The method of claim 1, wherein applying the hashing algorithm comprises applying the hash algorithm across a concatenation of the control field, the at least one clear key, the encrypted key field, and the first variant of the key-encrypting key to create the computed hash field.

11. A cryptographic system, comprising:
    means for receiving a secure key block that includes a control field with associated control attributes, an encrypted key field and a hash field;
    means for applying a hash algorithm across a concatenation of the control field, the encrypted key field, and a first variant of a key-encrypting key to create a computed hash field, wherein the control field is contained within the received secure key block; and
    means for validating the secure key block if the received hash field is equal to the computed hash field; and
    means operative for a validated secure key block for decrypting the encrypted key field to reveal the at least one clear key using the key-encrypting key.

12. The cryptographic system of claim 11, wherein the means for decrypting the encrypted key field includes
    means for obtaining the key-encrypting key,
    means for generating a second variant of the key-encrypting key through application of a variant offset value, and
    means for using the second variant of the first key as a decryption key to decrypt the encrypted key field.

13. The cryptographic system of claim 11, further comprising:
    means for decrypting the encrypted key field using the key-encrypting key.

14. The cryptographic system of claim 11, further comprising means for receiving the secure key block from a storage medium.

15. A cryptographic system, comprising:
    a host system communicatively coupled to at least one source;

a security module within a security boundary that is communicatively coupled to the host system, wherein the security module is configured to receive a secure key block, the secure key block containing a control field identifying attributes of at least one clear key, and an encrypted field containing an encrypted form of at least one clear key and an encrypted form of a received hash field that ties the control field and the at least one clear key, wherein the security module is configured to
apply a hash algorithm across a concatenation of the control field and the encrypted field to create a computed hash field,
validate the secure key block if the received hash field is equal to the computed hash field; and
for a validated secure key block, decrypt the encrypted field to reveal the at least one clear key.

16. The cryptographic system of claim 15, wherein the encrypted field is decrypted using a variant of a key-encrypting key.

17. The cryptographic system of claim 15, wherein the encrypted field is decrypted using a triple DES algorithm.

18. The cryptographic system of claim 15, wherein the encrypted field is decrypted using an AES algorithm.

19. The cryptographic system of claim 15, wherein the encrypted field further includes an encrypted pad.

20. The cryptographic system of claim 15, wherein the control field includes attributes of the at least one clear key.

21. The cryptographic system of claim 15, wherein the security module is configured to apply the hash algorithm across a concatenation of the control field, the at least one clear key, the encrypted key field, and the first variant of the key-encrypting key to create the computed hash field.

22. A cryptographic system, comprising:
means for receiving a secure key block that includes a control field with associated control attributes, and an encrypted field that contains an encrypted form of at least one clear key;
means for applying a hash algorithm across a concatenation of the control field and the encrypted field to create a computed hash field;
means for validating the secure key block if a received hash field in the received secure key block is equal to the computed hash field; and
means for decrypting the encrypted field to reveal at least one clear key for a validated secure key block,
wherein the means for decrypting the encrypted field includes
means for obtaining a key-encrypting key,
means for generating a variant of the key-encrypting key through application of a variant offset value, and
means for using the variant of the key-encrypting key as a decryption key to decrypt the encrypted field.

23. The cryptographic system of claim 22, further comprising means for receiving the secure key block from a storage medium.

* * * * *